Jan. 11, 1944.  B. R. PURVIN  2,338,737
MACHINE TOOL
Filed Feb. 3, 1940  10 Sheets-Sheet 2

INVENTOR
Benjamin R. Purvin
BY
Parker, Carlson, Pitzner & Hubbard
ATTORNEYS

Jan. 11, 1944.    B. R. PURVIN    2,338,737
MACHINE TOOL
Filed Feb. 3, 1940    10 Sheets-Sheet 3

INVENTOR
Benjamin R. Purvin
BY
Parker, Carbon, Pitner & Hubbard
ATTORNEYS

Jan. 11, 1944.   B. R. PURVIN   2,338,737
MACHINE TOOL
Filed Feb. 3, 1940   10 Sheets-Sheet 4

INVENTOR
Benjamin R. Purvin
BY Parker, Carlson, Pitner & Hubbard
ATTORNEYS

Jan. 11, 1944. B. R. PURVIN 2,338,737
MACHINE TOOL
Filed Feb. 3, 1940 10 Sheets-Sheet 7

INVENTOR
Benjamin R. Purvin
BY
Parker, Carlson, Pitzner & Hubbard
ATTORNEYS

Jan. 11, 1944.   B. R. PURVIN   2,338,737
MACHINE TOOL
Filed Feb. 3, 1940   10 Sheets-Sheet 8

INVENTOR
Benjamin R. Purvin
BY
Parker, Carlson, Pitzner & Hubbard
ATTORNEYS

Jan. 11, 1944.  B. R. PURVIN  2,338,737
MACHINE TOOL
Filed Feb. 3, 1940  10 Sheets-Sheet 9

INVENTOR
Benjamin R. Purvin
BY
Parker, Carlson, Pitzner & Hubbard
ATTORNEYS

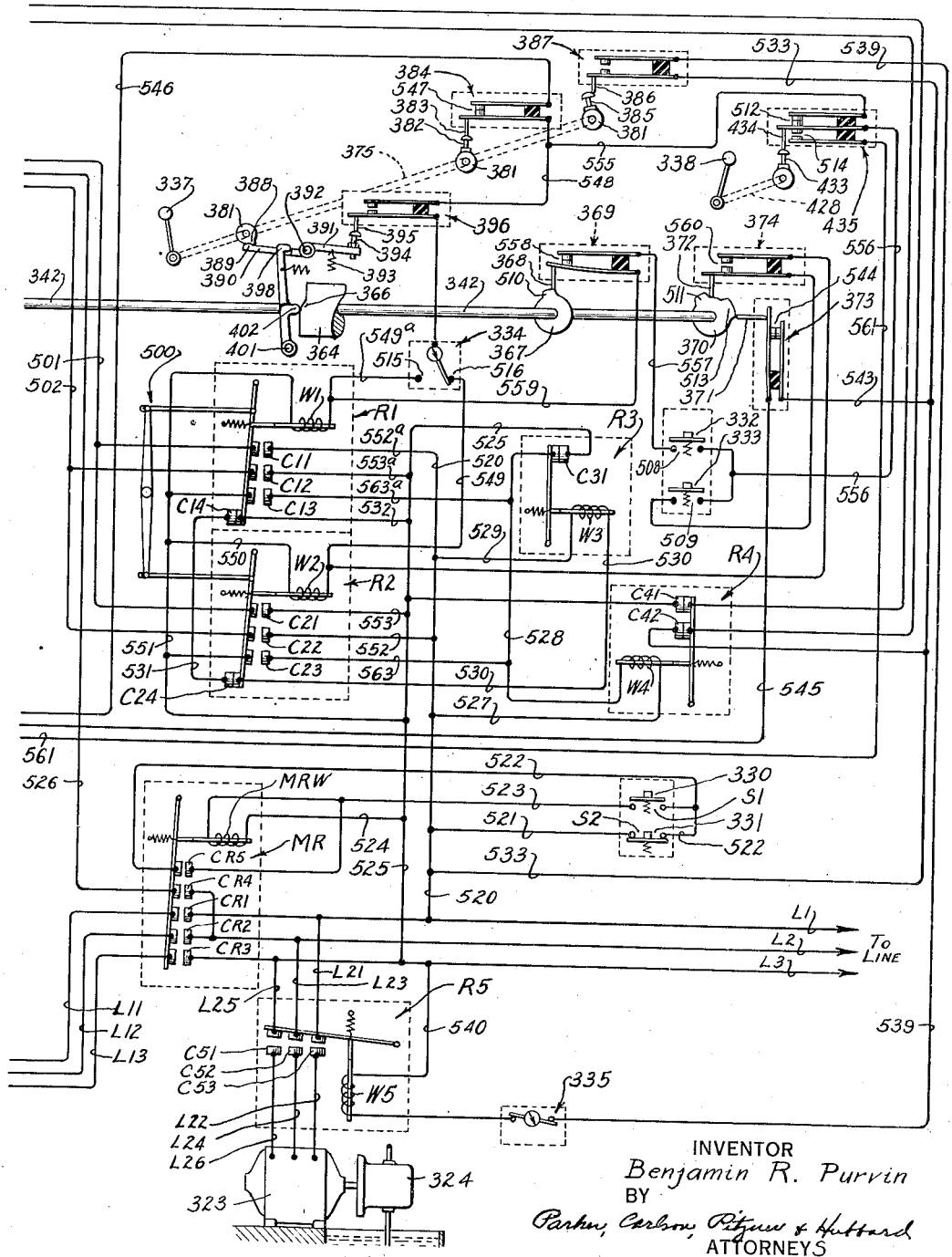

Patented Jan. 11, 1944

2,338,737

UNITED STATES PATENT OFFICE 2,338,737

MACHINE TOOL

Benjamin R. Purvin, Rockford, Ill., assignor to Barber-Colman Company, Rockford, Ill., a corporation of Illinois Application February 3, 1940, Serial No. 317,166

35 Claims. (Cl. 90—4)

The invention relates to machine tools, and has particular reference to a new and improved machine adapted for hobbing spur or helical gears, spur and spiral spline shafts, and other symmetrical forms capable of being hobbed.

An object of the invention is to provide a new and improved machine tool of this nature in which the machine elements have a compact vertical relationship as distinguished from the more conventional horizontal arrangement, and in which the machine elements are supported in such manner that in the machining operations close tolerances are accurately maintained and an improved finish is produced.

Another object of the invention is to provide a novel machine in which the movements of the machine elements and the control thereof are obtained by combined or interconnected electrically and hydraulically actuated means.

A further object is to provide in a machine of this character new and improved means for controlling movements of the machine elements which embodies electric power means for driving the elements during a cutting operation, hydraulic power means for moving the elements into operative relation and establishing the driving connections, and a combination of electrically and hydraulically responsive means for controlling cyclic operation including rapid traverse or return and for controlling various non-cyclic movements of the machine elements.

Another object is to provide new and improved means for initiating and controlling cyclic operation including the movement of the machine elements into operative relation, effecting relative spindle translation in one direction with a feeding movement, automatically discontinuing such movement at the end of the cut, effecting a rapid return movement, automatically discontinuing the return movement at the initial or starting position and retracting the machine elements to their relative inoperative relation.

In conjunction with the foregoing, an object is to provide in the machine control system novel means which enable the operator to perform the following manipulative acts: (1) stop a cycle at will and either return the machine elements to their starting position, or maintain the elements in the relation in which they are stopped for subsequent resumption of the cycle; (2) control the main driving clutch independently of the cycle; (3) rapidly traverse the spindles relatively only when the machine elements will not be damaged by such movement; and (4) conveniently and quickly adapt the machine elements for conventional or climb cutting with feed in either direction, and set the control mechanism to correspond.

Other objects and advantages will become apparent in the following description and from the accompanying drawings, in which.

Figure 9:
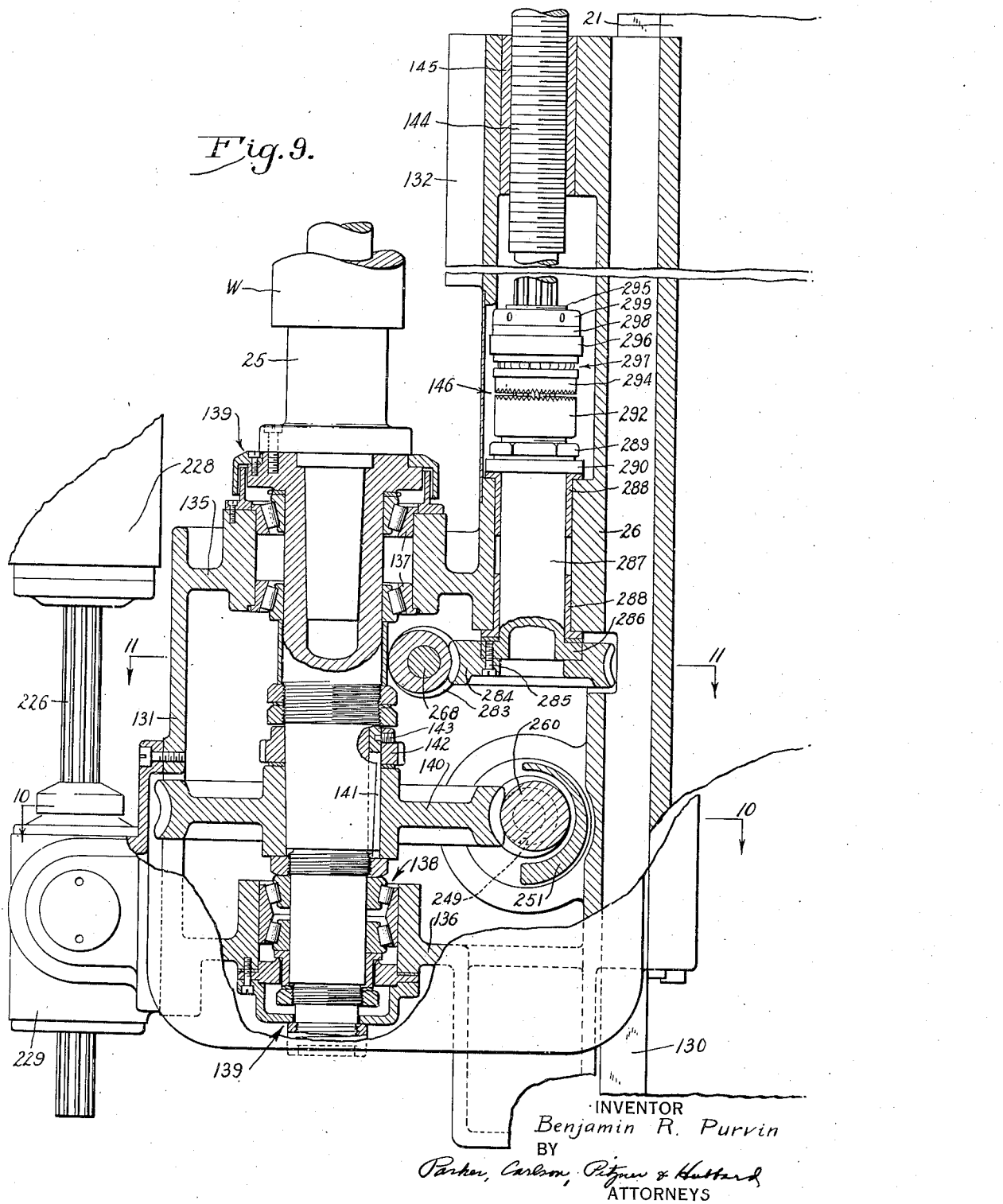
Fig. 9 is a sectional view through the work spindle assembly taken substantially on the plane of the axes of the work spindle and feed screw.
Figure 10:
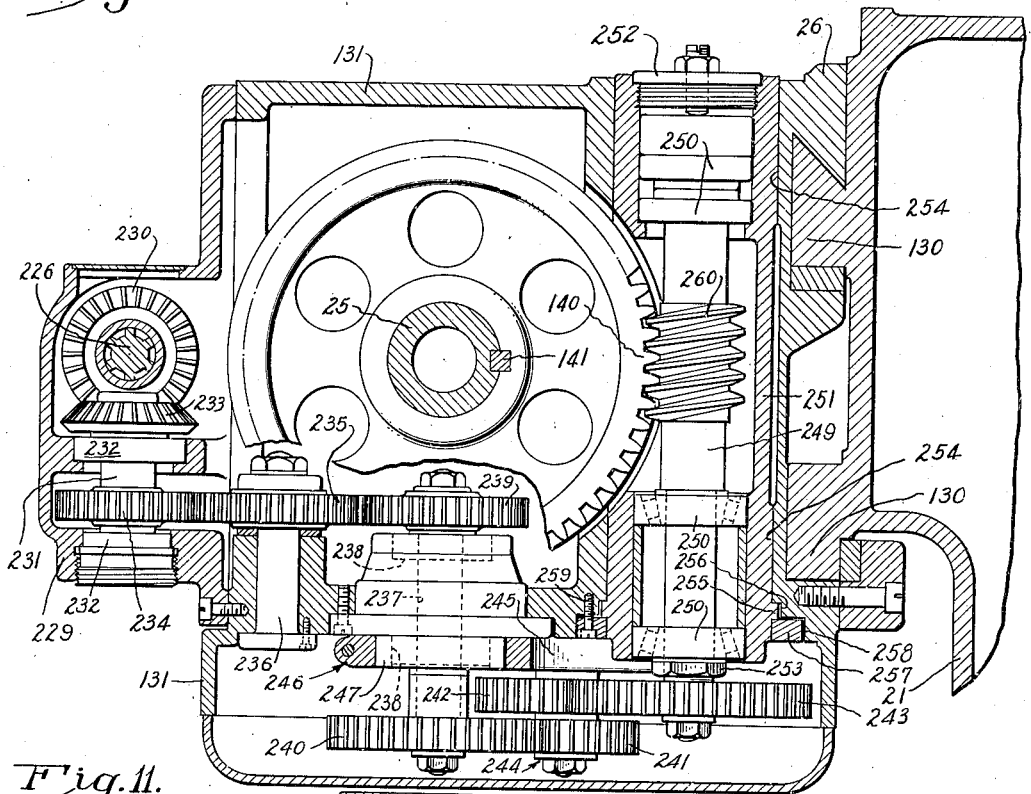
Figure 11:
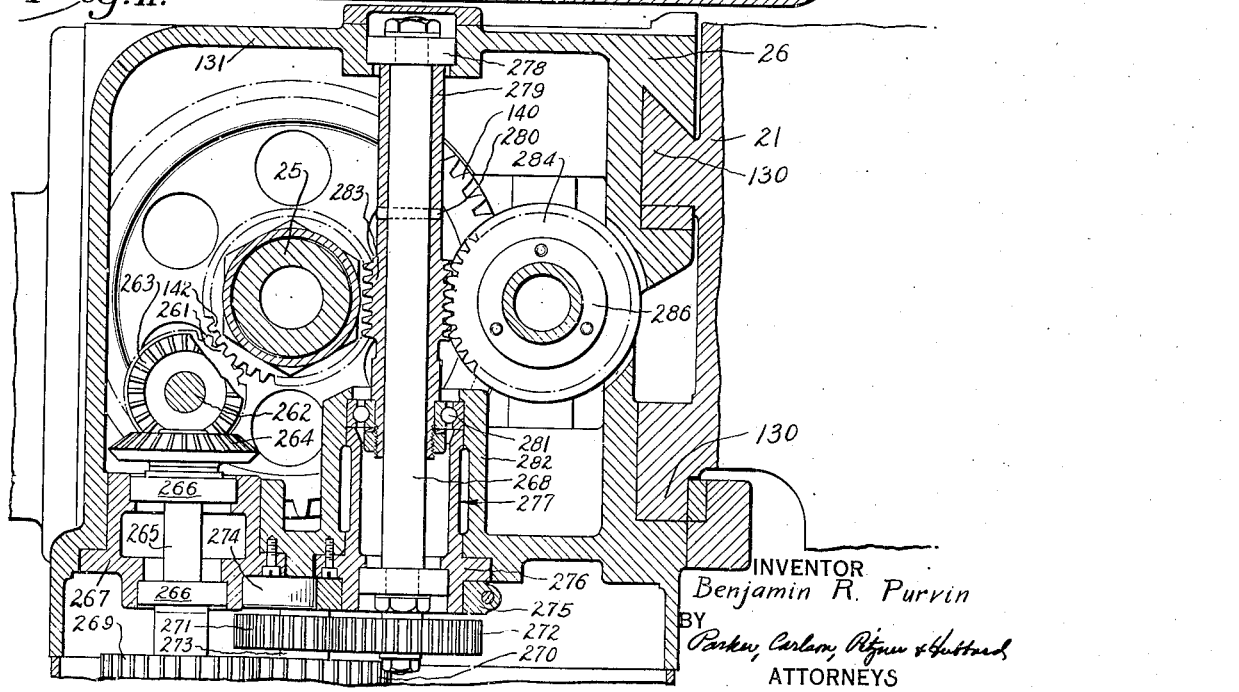

Figs. 10 and 11 are sectional views illustrating the driving mechanism for the work spindle and feed screw, and are taken respectively along the transverse planes indicated by the lines 10—10 and 11—11 of Fig. 9.

Figure 12:
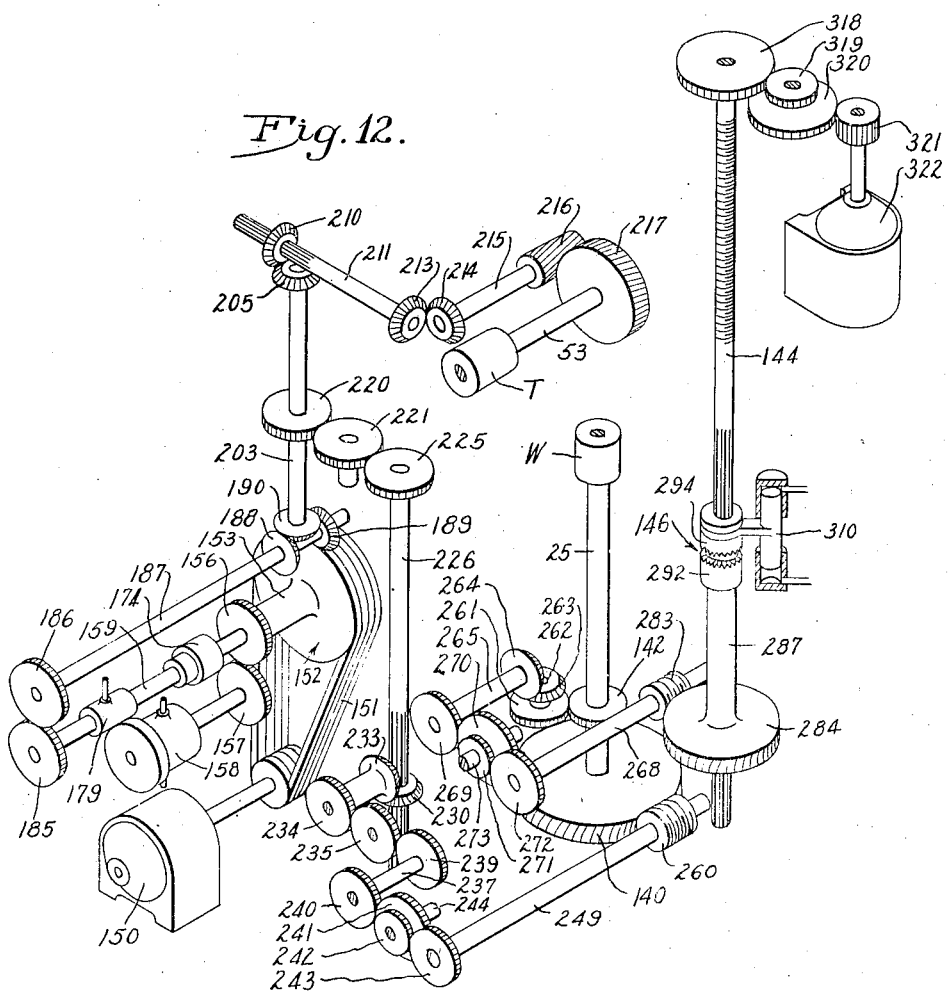

Fig. 12 is a diagrammatic representation of the driving mechanism of the machine tool.

Figure 13:
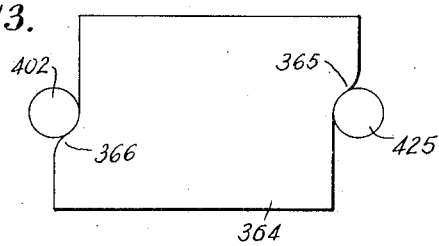

Fig. 13 is a diagrammatic representation of the double ended control cam illustrating its operative relationship to the cam followers associated therewith.

Figure 14:
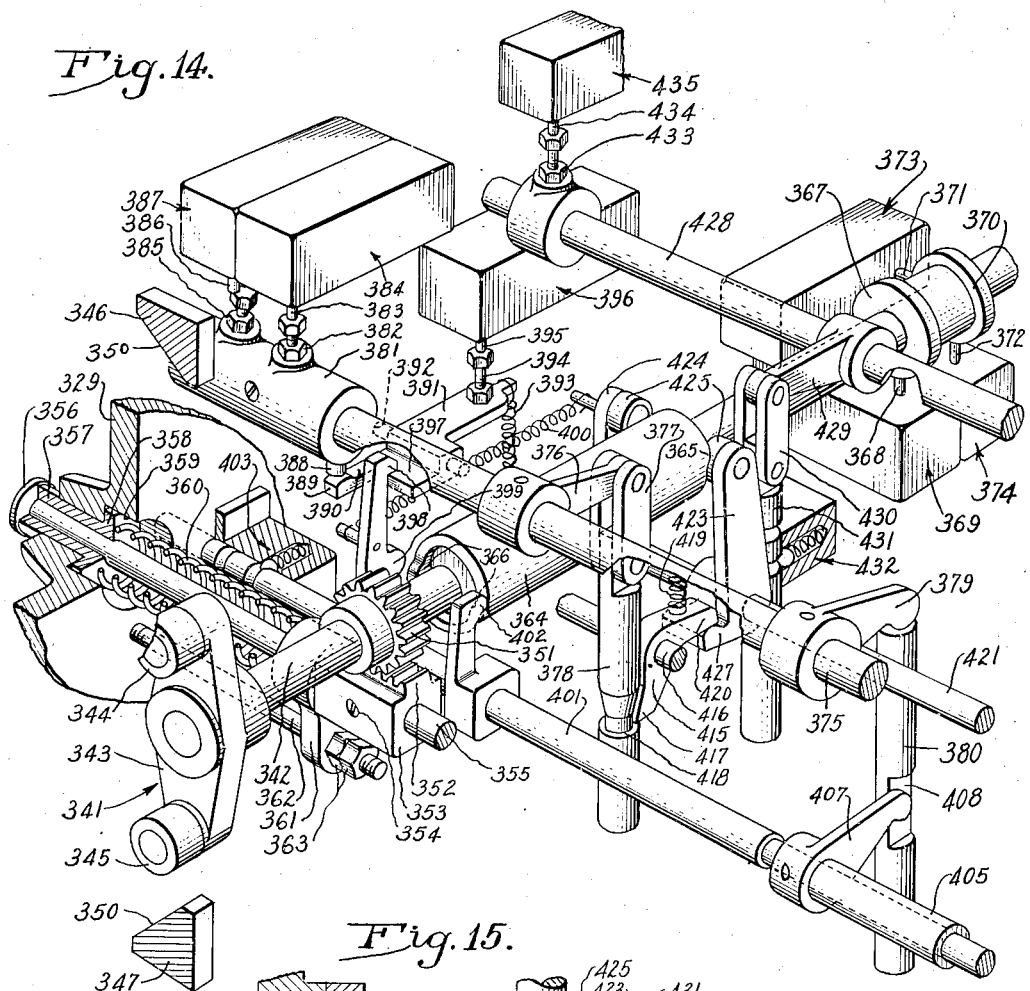

Fig. 14 is a perspective view of the valve and switch control mechanism.

Figure 1:
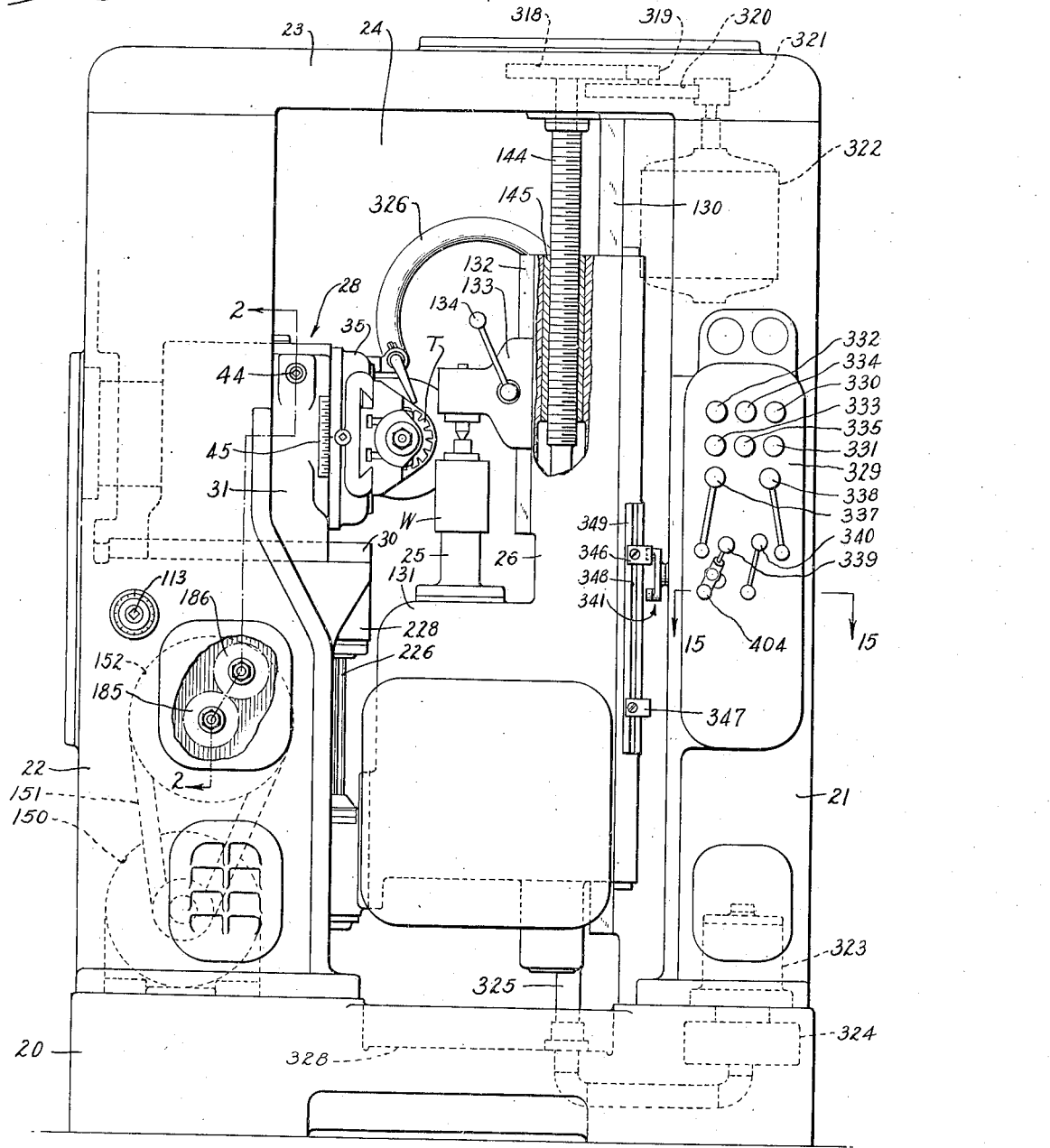
Figure 1 is a front elevational view of a machine tool embodying the features of the invention.
Figure 15:
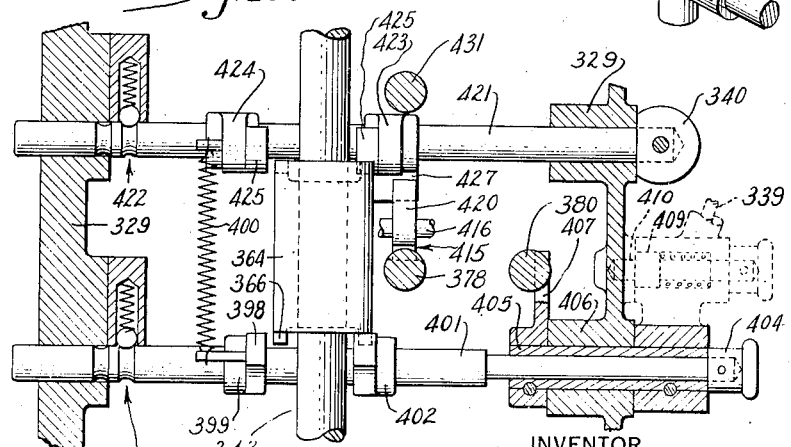

Fig. 15 is a sectional view through the control casing taken along the line 15—15 of Fig. 1.

Figure 16:
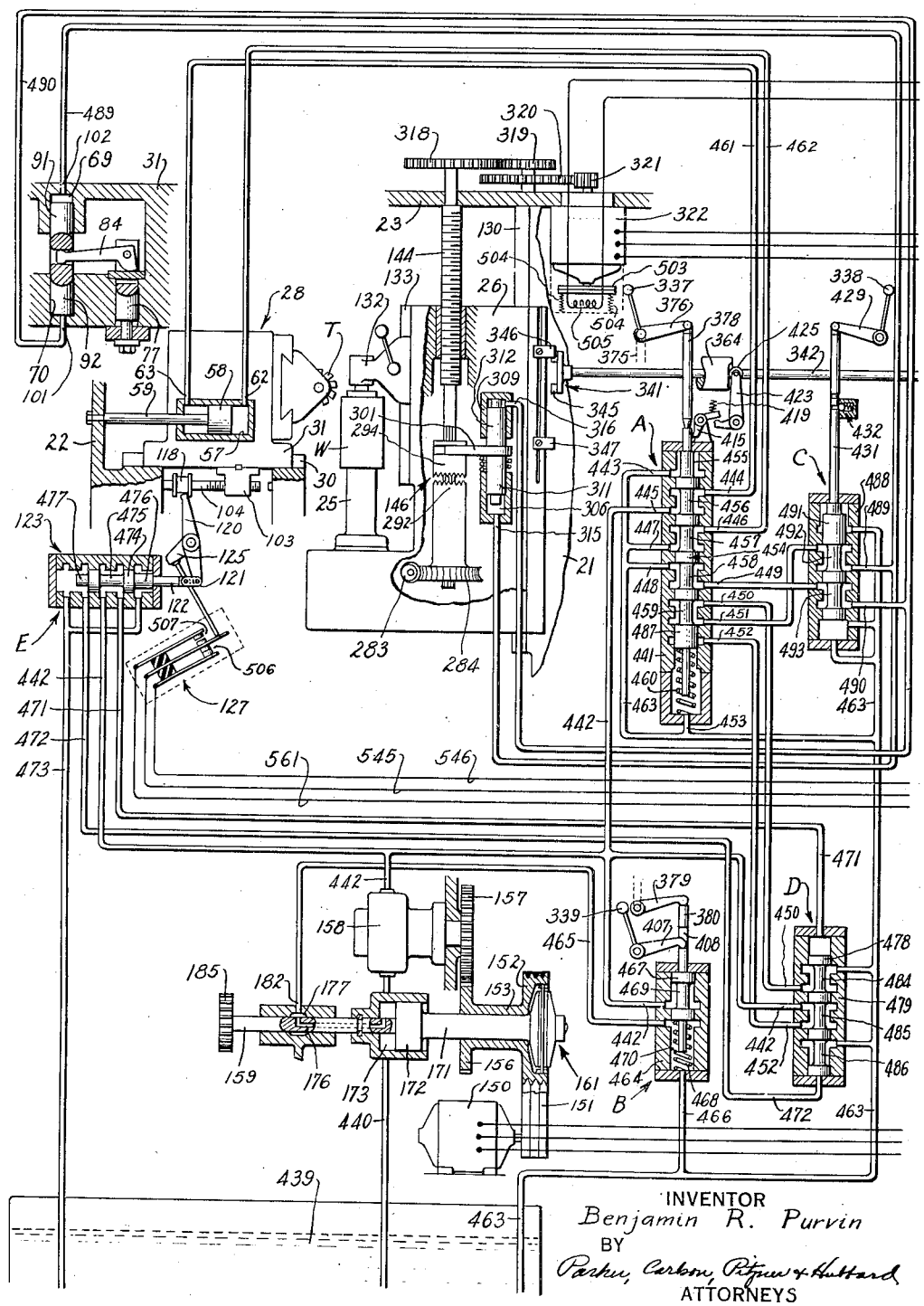

Figs. 16 and 17 are diagrammatic representations of the hydraulic and electrical control means. The figures may be combined to show the complete system by alinement of the right hand side of Fig. 16 with the left hand side of Fig. 17.

The machine organization in general

A machine organization in which an exemplary form of the invention is embodied comprises a base upon which is mounted a pair of spaced upright hollow columns rigidly tied together at the top by a bridge. One column supports a vertically reciprocable slide for the work spindle, and associated driving means for rotating the spindle and for feeding the slide. Preferably, a control panel and driving means for effecting a rapid traverse movement of the work slide is mounted on the same column. The opposite column supports a slide on which the tool spindle is mounted, and is horizontally reciprocable to move a tool into and out of operative relation to a work blank on the work spindle. The tool spindle is driven by a prime mover located in its associated column through intermediate driving connections which includes a branch power transmission leading to the work spindle and feed driving means.

The power drive means and the control means therefor include a combination of hydraulically and electrically actuated mechanisms, in which the tool and work spindles and the feed means are driven from an electric motor as a prime mover, the rapid traverse is driven by a separate electric motor, the movements of the machine elements into and out of operative relation are hydraulically actuated, and the controls are interrelated hydraulic and electric means arranged to cause a cycle of machine operation which includes relative movement of the machine elements into operative relation, initiation of the spindle and feed drives, relative translation of the spindles to perform a working operation, automatic stop of feed upon completion of the cut, initiation of a rapid return movement, automatic stop when the elements have been returned to the starting position, and retraction of the machine elements to an inoperative relationship. The control means also permits auxiliary machine movements at the will of the operator when the machine elements have certain operative relationships and the relationships determine the character of the permitted auxiliary movements.

Referring more particularly to the exemplary machine illustrated in the drawings and with particular reference to Fig. 1, the numeral 20 designates a base from which vertical columns 21 and 22 rise near either end thereof. (For convenience in description the columns will be referred to as right-hand column 21 and left-hand column 22). Extending across the tops of the columns and secured thereto is a bridge 23. The base, the columns and the bridge define a central space or opening 24 in which the operative elements of the machine are disposed, and form a rigid supporting structure that is capable of withstanding, without yielding, the heavy stresses imposed during a cutting operation such as hobbing. The tool and work spindles are so correlated that the stresses are mainly exerted generally in horizontal direction toward the two columns, which being firmly and rigidly tied together top and bottom cannot flex. This relationship is important since the resulting rigidity of the frame permits high speed machine operation with maintenance of close tolerances and production of unusually smooth finished surfaces.

In the present embodiment, the work spindle 25 is supported from the right-hand column by a vertically reciprocable slide 26 having associated therewith means for traversing the work relative to the tool through feed and rapid traverse movements. Mounted on the left-hand column 22 is a tool support 28 for a tool T adapted for horizontal reciprocation into and out of operative relation with respect to the path of travel of the work W, the tool support including various adjustments affording proper correlation of the tool with respect to the work.

The tool supporting means (refer to Figs. 1 to 7 incl. and 12)

The side of the left-hand column 22 which faces toward opposite column has an enlarged recess or opening 29 (Fig. 2) therein located substantially midway between the base 20 and the bridge 23. Horizontally disposed ways 30 extending inwardly of the opening 29 support a ram or slide 31 which, for convenience, will hereinafter be termed the swivel slide, since it supports the means by which the position of the tool may be properly correlated with respect to the work.

The swivel slide 31 projects from the column 22 into the space 24, and is formed with an end wall 32 (Fig. 4) and externally thereof with an annular guide or way 33 having an annular T-slot 34. A slide swivel 35 is mounted for angular adjustment against the outer face of the way 33, and is adapted to be secured in position by means of clamp bolts (not shown) engaging in the T-slot 34. The slide swivel 35 has a short cylindrical centering boss 36 which interfits with the inner peripheral face of the way 33.

To provide means for adjusting the slide swivel 35, an arcuate worm gear segment 37 (Figs. 2 and 3) is suitably secured, as by screw bolts 38, coaxially to the inner end of the boss 36. The worm gear segment 37 meshes with a worm 39 keyed to a shaft 40 within a tangential bore 41 formed in the upper portion of the swivel slide 31 and opening to one side thereof. The outer end of the shaft 40 is journaled in and extends through a bearing sleeve 42 fixed in the outer end of the bore 41 as by means of a pin 43, and the inner end of the shaft is suitably journaled in the body of the slide. The extreme outer end of the shaft 40 is provided with a socketed head 44 adapted for the reception of a suitable hand tool (not shown). It will be seen that upon rotation of the shaft 40, the worm 39 will rotate the gear segment 37 to adjust the angular position of the swivel 35. The degree or extent of adjustment may be determined by means of cooperative indicia 45 (Figs. 1 and 5) on mating edges of the annular way 33 and the swivel 35.

The outer face of the swivel 35 is formed with a diametrically extending dovetail guideway 46 (Figs. 4 and 5) for supporting a spindle slide 47. The position of the slide 47 is adjustable along the guideway 46 to effect operative engagement of different portions of the tool T with the work W. Thus, an adjusting shaft 48 (Fig. 4) is journaled on the swivel 35 longitudinally of the guideway 46, the outer end portion of the shaft extending through a fixed bearing sleeve 49, and being constrained against axial movement by an outer socketed head 50 and an inwardly spaced collar 51 fixed thereon and bearing respectively against opposite ends of the sleeve. The inner end portion of the shaft 48 is screw threaded for engagement with a nut 52 fixed to the spindle slide 47.

The tool T, which is illustrated as a hob, is fixed on a tool spindle 53 journaled in spaced bearings 54 on the slide 47 with its axis extending longitudinally thereof. One of the bearings 54 is mounted on the slide 47 for removal and for adjustment along suitable T-slots 55. The spindle is adapted to be driven, as will be presently described, by mechanism which extends through the spindle slide 47, the swivel 35, and the swivel slide 31.

In the present embodiment, the swivel slide 31 is a hollow generally rectangular structure having closed top, side and outer walls and open bottom and inner walls. Movement of the slide 31 between its retracted and extended positions is preferably effected by hydraulically actuated means. Thus, referring to Figs. 2 and 7, an internal enlargement 56 on one side wall is bored to provide a cylinder 57 paralleling the direction of slide movement. A piston 58 in the cylinder has a rod 59 extending beyond the rear face of the slide through a packing gland 60 which closes the rear end of the cylinder. The rear or outer end of the rod is rigidly secured, as indicated at 61, to the left hand column 22. Spaced fluid ports 62 and 63 open into opposite ends of the cylinder for connection with pressure fluid lines of the hydraulic system.

An important feature is the provision of means for rigidly clamping the swivel slide 31 in its extended position. In this embodiment, the clamping means is hydraulically actuated. Referring to Figs. 2, 4, 5 and 6, the side walls of the slide have bosses 65 provided with bores 66 that open downwardly and are crossed by the vertical plane of the outer side edges of the slide supporting ways 30 (see Fig. 6). These bores are spaced in the direction of slide movement and, as shown, are located approximately at the four corners of the slide. Each side wall between the front and rear bores has a downwardly extending boss 67 (Fig. 5) and an upwardly extending boss 68 (Figs. 4 and 5) provided respectively with cylinders 69 and 70. The cylinders preferably are axially alined.

Clamping means is associated with each set of bores and cylinders on each side wall and, since the structures on opposite sides of the slide are identical, only one need be described in detail. Each side wall of the slide has a depending guide flange 71 which slidably engages the outer faces, and extends downwardly to approximately the lower face, of its associated way 30 (see Fig. 6). A gib plate 72 is secured, as by means of screw bolts 73, to the lower face of the guide flange 71 so as to underlie the way 30, and thereby maintain the slide 31 in bearing engagement with the top of the way. Preferably, a taper gib 74 is interposed between the way 30 and the gib plate 72. Each end bore 65 has a clamping plunger 77 slidably mounted therein, and the lower end of the plunger is notched, as at 78, to clear the portion of the way 30 that extends partially across the bore. A threaded stem 79 extends downwardly from the plunger 77 through the gib plate 72 and through a clamp block or shoe 80 which is seated in a notch 81 in the top of the gib plate in underlying relation to the taper gib 74. An adjusting nut 82 is threaded on the stem 79 and extends slidably through the gib plate 72 for bearing engagement at its upper end against the clamp shoe 80. Upward movement of the clamping plunger accordingly will move the shoe to bind the taper gib 80 firmly against the way 30.

Figure 5:
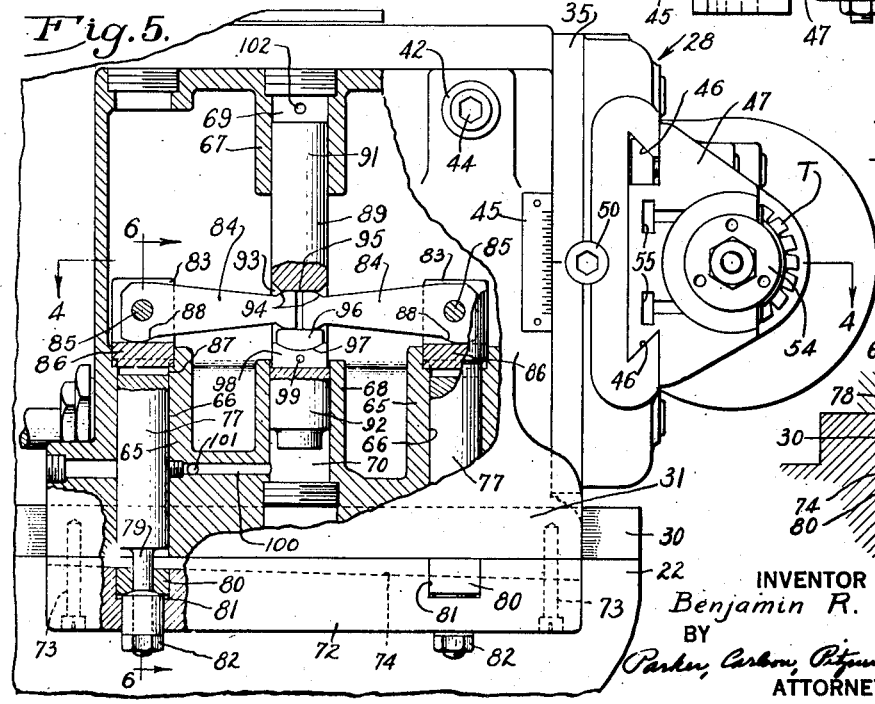
Fig. 5 is a side view of the swivel slide partially broken away to illustrate the arrangement of the internally located clamping means.
Figure 6:
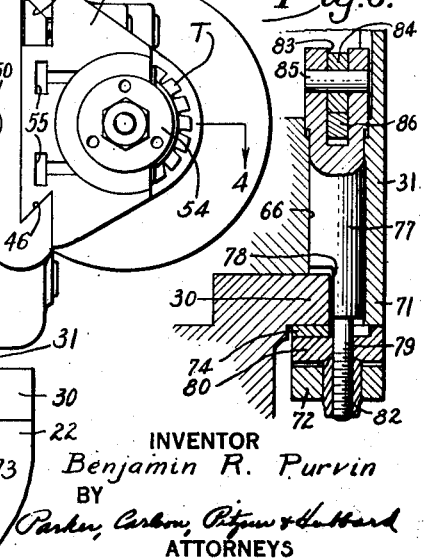
Fig. 6 is a sectional view of a detail of the clamping means taken as indicated by the line 6—6 of Fig. 5.

The upper end of the clamping plunger 77 extends beyond the end of its supporting boss, as shown in Fig. 5, and is bifurcated, as indicated at 83 to receive the end of a clamping lever 84 which is pivoted to the pin at 85. A hardened block 86 is interposed between the pivoted end of the lever and the base of the slot which forms the bifurcation, and this block seats at each end in appropriate recesses 87 in the boss. The clamping lever adjacent the block has an eccentric or cam-shaped surface 88 thereon arranged in the oscillation of the lever to effect relative movement between the clamping pin and the hardened block. In the present instance, movement of the free end of the lever upwardly produces an upward movement of the clamping plunger 77.

As shown in Fig. 5, the clamping levers 84 of both clamping plungers 77 on one side of the slide 31 extend toward each other nearly to the axis of the cylinders 69, 70. The cylinders slidably support the opposite ends of a common reciprocable member 89, the end portions of which constitute pistons 91 and 92, respectively. The adjacent ends of the clamping levers extend from opposite sides into a transverse slot 93 formed in the reciprocable member 89, and have arcuate side edges 94 arranged to rock against the upper surface 95 of the slot and against one face of a compensator device by which the clamping forces exerted on the levers are equalized. The compensator includes a movable block 96 against which the levers bear, and this block has an arcuate face 97 seated for rocking movement in a complementary recess in supporting member 98 pinned in position, as at 99, against the lower surface of the slot 93. A fluid passage 100, 101 opens to the lower end of the cylinders 70 for admitting fluid under pressure to elevate this member 89 when the slide 31 is to be clamped in position, and for exhausting the cylinders when the clamping mechanism is to be released. Similarly, the upper end of the cylinder 69 is provided with a fluid passage 102 for relieving the pressure therein and admitting fluid pressure thereto respectively upon application and release of the clamping mechanism.

Figure 7:
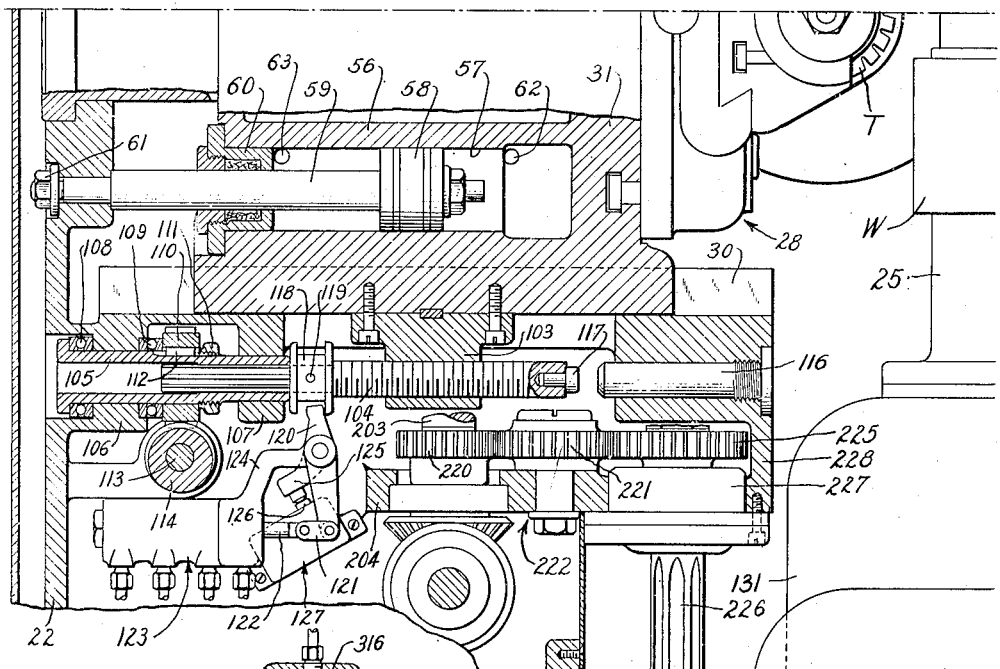
Fig. 7 is a sectional view through the machine tool below the swivel slide assembly on the vertical plane, indicated by the line 7—7 of Fig. 2.

Means is provided for adjustably determining the extended or advanced position of the swivel slide 31 and its associated parts. Referring to Fig. 7, the slide has affixed thereto at one side of center a depending nut 103 for engagement by a screw 104 disposed in parallelism with the slide ways 30. A tubular shaft 105 rotatably supported in bearing lugs 106 and 107 of the left hand column 22 is axially alined with the screw and receives one end thereof. The shaft and screw ends are splined to provide for relative sliding and non-rotatable movement. Spaced end thrust bearings 108 and 109 confined on the tubular shaft 105 engage opposite sides of the lug 106. A worm gear 110 disposed between the thrust bearing 109 and a nut 111 on the shaft 105 is keyed to the shaft, as at 112. The shaft 105 is then held against axial movement, and is rotatable by means of the gear 110. An operating shaft 113 is rotatably journaled on the column 22 transversely of the tubular shaft 105, and carries a worm 114 meshing with the worm gear 110. The outer end of the shaft 113 extends through the column (see Fig. 1) for manipulation by the operator to effect rotation of the screw 104.

The limits of slide movement are determined by suitable stops. Thus, the advanced or extended position of the slide 31 is limited by a stop pin 116 mounted on the column for engagement by a head 117 on the free end of the screw. The retracted position of the slide 31 is determined by the abutment of a shifting collar 118, pinned to the screw as at 119, with the inner end of the tubular shaft 105. By rotating the screw 104 and thereby adjusting the position of the slide 31 in relation to the stops 116 and 118, the extended or operative position of the slide is adjusted and predetermined, and incidentally the retracted position is correspondingly adjusted.

As will presently be more particularly described, the advancing and retracting movements of the swivel slide are used to establish certain relationships in the control system. The shifting collar 118, is therefore, arranged to swing a lever 120 which is connected through a link 121 with the stem 122 of a pilot valve mounted in a valve casing 123 (Fig. 7). The lever may be pivotally supported by an arm 124 on the valve casing. The shifting collar 118 and the lever 120 have a lost motion connection such that the valve will be alternately disposed in its two operative positions as the swivel slide completes its movement respectively into the advanced and retracted positions. An arm 125 fixed for movement with the lever 120 is adapted to engage the end of an actuator 126 for an electric switch housed in a casing 127 upon movement of the slide into retracted position, and to release the actuator upon movement of the slide into advanced position. The switch is arranged selectively to close one or the other of a pair of circuits depending on the position of the swivel slide.

*The work supporting means (refer to Figs. 1, 9, 10 and 11)*

The inner face of the right-hand column 21 is provided with a pair of horizontally spaced, vertically extending ways 130 engageable by the vertically elongated work slide 26. At the lower end of the slide is an enlarged hollow casing 131 for supporting the work spindle for rotation on a vertical axis. The driving mechanism for the work spindle is also largely housed in the casing. Toward its upper end, the work slide has a pair of vertically extending ways 132 on its inner face for slidably supporting a tailstock 133 which is manipulable through means actuated by the lever 134 to adjust and fix the position of the tailstock.

The work spindle, as shown in Fig. 9, is rotatably supported on upper and lower casing walls 135 and 136 by combined radial and end thrust bearings 137 and 138, and suitable seals, generally designated 139 are interposed between the spindle and the casing. Within the casing, and between the ends of the spindle, is a worm gear 140 fixed as by a key 141 to the spindle. An adjacent pinion 142 is also secured to the spindle, as by one or more set screws 143.

A feed screw 144 extends vertically through a central portion of the work slide 26, and has screw threaded engagement by an elongated sleeve nut 145 fixed in the upper portion of the slide. The lower end of the feed screw may, by means of a clutch 146, be operatively engaged with mechanism to be described for driving the feed screw at a feeding speed. The upper end of the feed screw 144 is rotatably anchored in the bridge 23 to support the slide 26, as shown in Fig. 1, and is connected with mechanism for driving the feed screw and hence translating the slide at a rapid traverse speed.

*The tool spindle drive (refer to Figs. 1, 2, 4 and 12)*

In the present embodiment, the prime mover for driving the various machine elements during the working part of the cycle is an electric motor 150 mounted upon the base 20 within the left-hand column 22. A conventional plural V belt drive 151 connects the motor shaft with a pulley 152 having an elongated hub 153 rotatably journaled in a boss 154 (Fig. 2) on the rear wall 155 of the column. The inner end of the hub carries a drive gear 156 meshing with a gear 157 (Fig. 12) on the driving shaft of a pump 158 for supplying fluid under pressure to the hydraulic portion of the control system.

Figure 2:
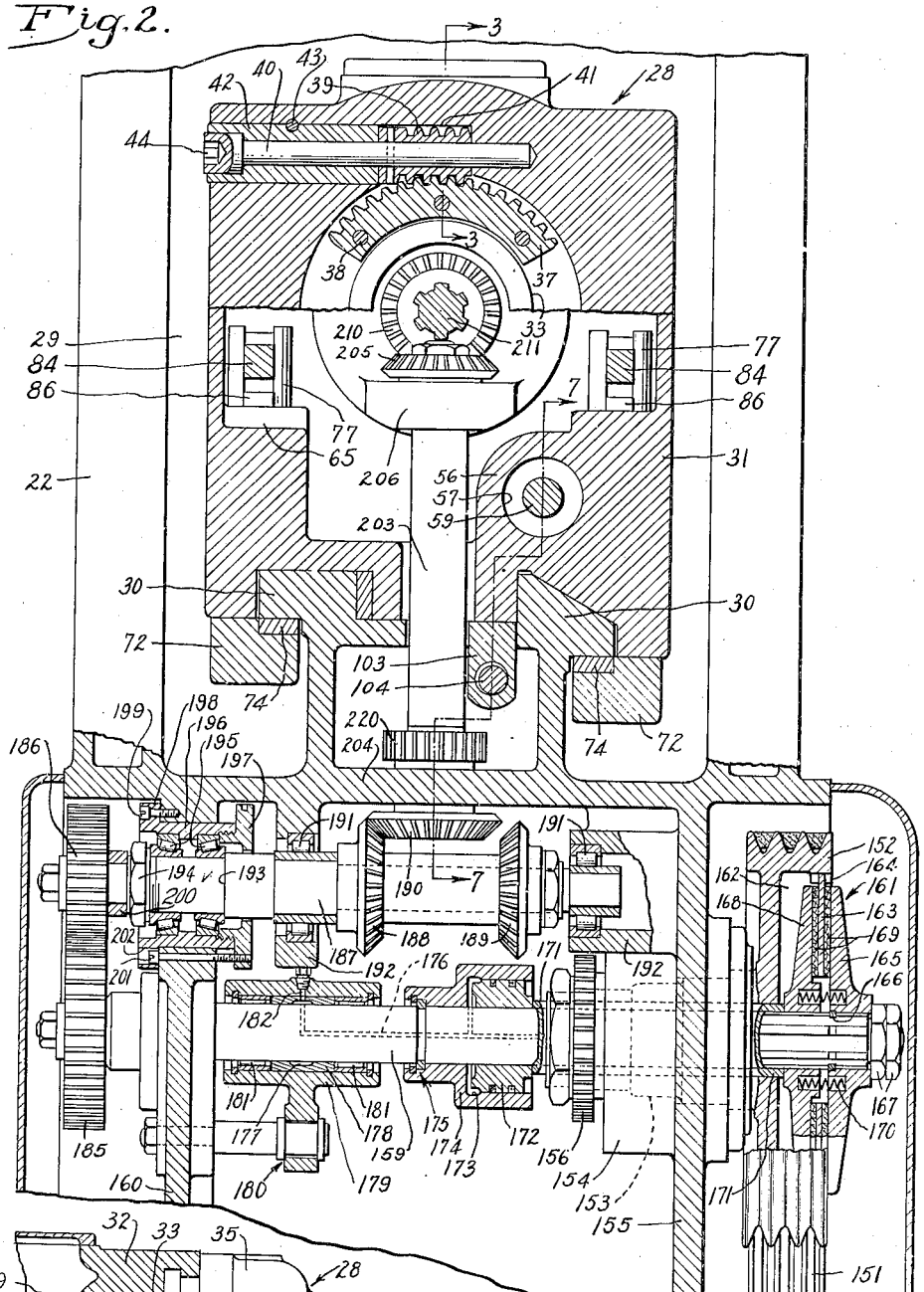
Fig. 2 is a sectional view through the swivel slide assembly taken substantially along the line 2—2 of Fig. 1.
Figure 3:
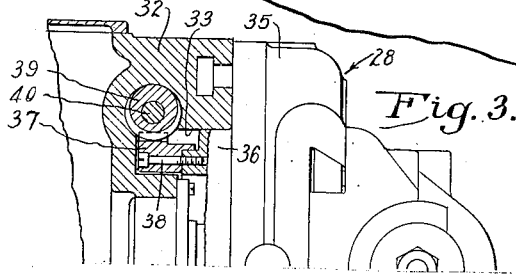
Fig. 3 is a sectional view of a detail of the swivel slide assembly taken substantially along the line 3—3 of Fig. 2.
Figure 4:
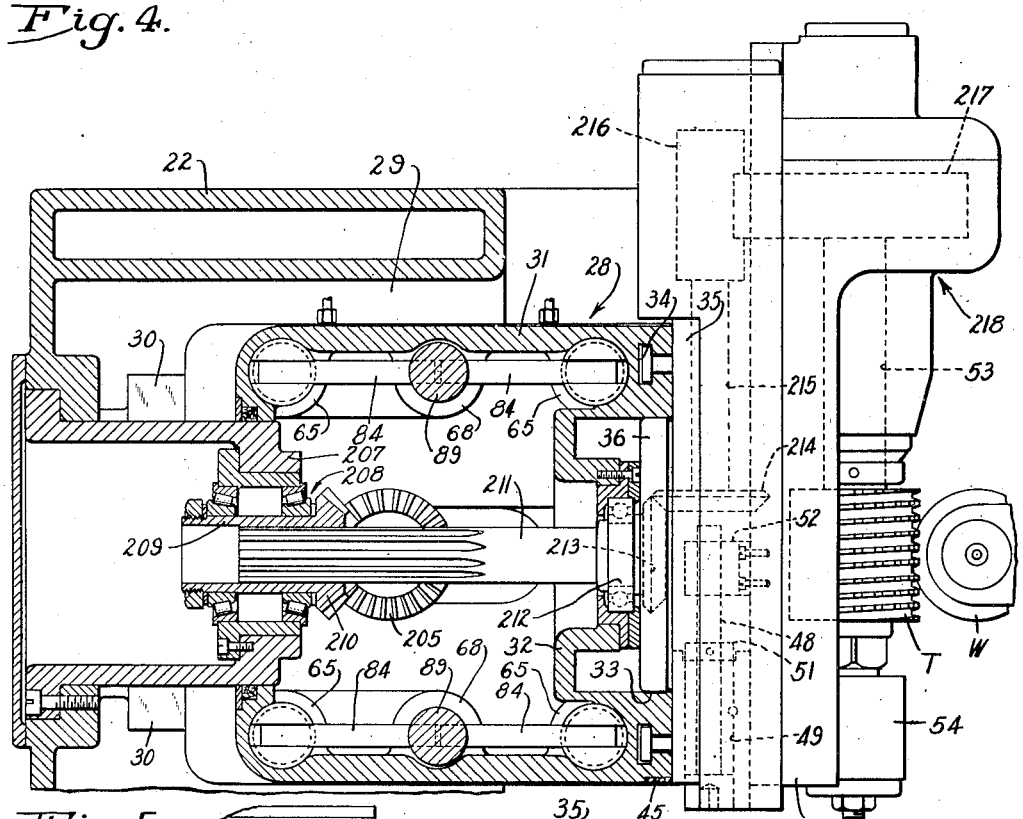
Fig. 4 is a view of the swivel slide assembly partly in plan and partly in section, as indicated by the line 4—4 of Fig. 5.

A drive shaft 159 extends forwardly of the column through the pulley and hub and is journaled in the front wall 160 of the column. The pulley and hub assembly is rotatable with respect to the drive shaft, but may be coupled thereto by hydraulically actuated clutch means 161. Thus, as shown in Fig. 2, the end face of the pulley is recessed as at 162. A friction disk 163 is splined, as at 164, for rotation with the pulley. The rear end portion of the drive shaft is splined, and a fixed clutch element 165 is secured to the end of the shaft by the splines, a split ring 166 and lock nuts 167. A coacting movable clutch element 168 is located within the pulley recess and slidably engages the splined portion of the drive shaft. Both the fixed and the movable clutch elements carry friction members 169 between which the friction disk 163 is disposed. Springs 170 interposed between the fixed and movable clutch elements exert their force normally to hold the elements apart.

The clutch is hydraulically actuated in the following manner. An elongated sleeve 171 is interposed between the pulley hub and the drive shaft, and at one end the sleeve abuts the clutch element 168. The sleeve is slidably related to the pulley hub and the drive shaft, and at its inner end abuts a piston 172 mounted in a cylinder 173 formed in an enlarged portion of a casing 174 that is secured to the drive shaft by such means as a pair of split rings 175. The admission of pressure fluid behind the piston will, through the slidable sleeve 171, close the clutch 161 and establish a driving connection between the pulley and the drive shaft. Pressure fluid is adapted to be admitted to the cylinder 173 behind the piston 172 by a passage 176 formed in the drive shaft. The passage communicates with an annular recess 177 in a sleeve 178 that encircles the drive shaft and is fixed in a sleeve 179 anchored against rotation, as at 180, to the front wall of the column. Opposite ends of the sleeve 178 provide seals to prevent the escape of fluid along the shaft 159. Roller bearings 181 are mounted in the casing 179 at opposite ends of the sleeve 178 to support the casing. The recess 177 in the sleeve 178 communicates through a port 182 with a pressure fluid supply passage.

The front end of the drive shaft extends forwardly of the column wall 160 and carries one gear 185 of a pair of pick-off gears. The other pick-off gear 186 is fixed to the front end of a shaft 187 which is parallel to and above the drive shaft and carries a spaced pair of bevel gears 188 and 189 arranged to be selectively engaged with a complementary gear 190 on the lower end of a vertical drive shaft. Driving engagement of one or the other of the bevel gears 188, 189 with the gear 190 is effected as the machine is being set up for operation, and the engagement will determine the direction of rotation of the tool spindle, the work spindle and the feed screw. To enable this selective engagement to be easily made, the shaft 187 is, on either side of the bevel gears 188, 189 supported by bearings 191 on stationary parts 192. The bearings permit the shaft to shift axially a distance sufficient to bring one or the other of the bevel gears into engagement with the gear 190. The front end of the shaft has a shoulder 193 and a nut 194 between which are disposed the inner races of a pair of radial thrust bearings 195. The outer races of these bearings are mounted in a bearing cage comprising a cylindrical member 196 and a plate 197 screw threaded into one end of the cylindrical member and extending radially thereof to form an abutment. The cylindrical member is slidably supported by the front wall of the column with the plate adjacent the inner face of the wall. The outer end of the sleeve has an annular flange 198 through which the bearing cage may be secured to the front wall by a screw 199. In this position, one of the bevel gears (in this instance the left-hand bevel gear 188) engages the gear 190 and a spacer 200 interposed between the pick-off gear 186 and the nut 194 coacts to determine the proper position of the pick-off gear to its mating gear. To effect engagement of the opposite or right-hand bevel gear 189 with the gear 190, the screw 199 and the spacer 200 are removed and the shaft 187 is shifted endwise to the left and maintained in that position by a screw 201 which bears against the column wall and engages the plate on the bearing cage. The head of this screw is accessible through an aperture 202 in the annular flange 198.

The selective direction of drive afforded by the alternate gears 188, 189 and the gear 190 permits the operator in setting up the machine to effect a feed movement upwardly or downwardly with rotation of the tool and work spindles in a proper direction. These gears furthermore may be changed in coordination with speed change gears 240 to 243 inclusive (to be hereinafter described) through which the work spindle and feed screw are driven. Thus, selection between the gears 188 and 189 drives the machine elements for a conventional cut either upwardly or downwardly. Selection between these two gears in conjunction with a replacement of the intermediate gears 241, 242 of the speed change gear train by other intermediate gears including an extra gear for reversing the direction of rotation will condition the machine elements for climb cutting either upwardly or downwardly.

A shaft 203 to which the bevel gear 190 is affixed is journaled on a transverse wall 204 (Fig. 2) of the column and extends vertically into the swivel slide 31 between its supporting ways 30. The shaft has a bevel gear 205 at its upper end, and below the gear the shaft is mounted in a bearing carried by a bracket 206 which extends endwise from a cylindrical boss 207 (Fig. 4) into the inner side of the swivel slide. The boss is mounted on the outer wall of the column and above the bracket supports a radial and end thrust bearing 208 for the hub 209 of a bevel gear 210. This gear constantly engages the bevel gear 205 on the vertical shaft regardless of the position of the swivel slide. A shaft 211 journaled by a bearing 212 in the front wall 32 of the swivel slide 31 is splined in the gear 210 for rotation therewith and for relative axial movement upon adjustment of the swivel slide.

The shaft 211 is coaxial with the swivel 35, and at its front end carries a bevel gear 213 (Fig. 4) disposed beyond the front wall 32 of the slide. The gear meshes with a similar gear 214 fixed to a shaft 215 which parallels the guideway 46 of the spindle slide 47. At its outer end, the shaft 215 carries an elongated pinion 216 for engagement by a gear 217 mounted on the end of the tool spindle 53 within a housing 218. The engagement between the elongated pinion 216 and the gear 217 is effective through the range of adjustment of the spindle slide 47.

*The work drive (refer to Figs. 1, 2, 7 to 10 incl. and 12)*

The vertical shaft 203 that extends into the swivel slide as a part of the driving mechanism of the tool spindle 53 has a power take-off leading to the gearing in the casing 131 through which the work spindle 25 and the feed screw 144 are driven.

Referring particularly to Fig. 7, the vertical shaft 203 below the swivel slide and its supporting ways has a pinion 220 fixed thereon in mesh with an idler pinion 221 supported, as at 222, on the transverse wall 204 and meshing in turn with another pinion 225 on the upper end of a vertical shaft 226. The shaft is supported at its upper end by a bearing 227 on an overhanging portion 228 of the wall 204.

The gear casing 131 of the opposed work slide includes, as shown in Figs. 7, 9 and 10, a forwardly extending housing 229 through which the lower end of the depending shaft 226 passes. Inside the housing a bevel gear 230 (Figs. 7 and 10) is slidably splined to the depending shaft. The bevel gear is journaled in the housing for vertical movement with the work slide. A horizontal stub shaft 231 (Fig. 10) is rotatably mounted in the housing in bearings 232, and at one end carries a bevel gear 233 in engagement with the bevel gear 230. A pinion 234 on the shaft 231 meshes with an idler gear 235 on a stub shaft 236 in the casing 131. Paralleling the stub shaft 236 is a shaft 237 supported by bearings 238 in the front wall of the casing. At one end, the rotatable shaft carries a pinion 239 engaging the idler gear 235, and the other end of the shaft extends outwardly of the casing to receive the first gear of a series of speed change gears 240, 241, 242 and 243. This gear train may be set up for hobbing straight gashes in the work or for hobbing gashes having spiral angles. To accommodate adjustment of the gear train, the intermediate gears 241, 242 are supported by a stub shaft 244 mounted on an adjustable arm 245 secured, through a split collar connection 246, to a flange 247 on the bearing 238.

The last gear of the change gear train is secured to one end of a horizontal shaft 249 which is journaled in pairs of end bearings 250. The outer pair of bearings is seated at one end against a shoulder formed in an elongated sleeve 251 and are held in place by a screw threaded cap 252 at the outer end of the sleeve. The inner pair of bearings abut an end nut 253 on the shaft 249 and have a floating relation to the sleeve 251, a separated relation between said bearings being maintained by a suitable spacer. The end portions of the sleeve are supported in spaced axially alined bores 254 formed in the casing 131. Suitable means for securing the sleeve to the casing comprises, in this instance, an annular rib 255 (Fig. 10) on the sleeve near the front end thereof arranged to seat in a groove 256 formed in the casing. A clamping ring 257 encircles the end of the casing adjacent to the rib and is seated in a rabbeted groove 258 in the casing. Screws 259, or the like, secure the clamping ring and, in turn, the sleeve to the casing.

The central portion of the shaft has a worm 260 affixed thereon, and the sleeve is cut away to permit engagement of the worm into the wheel 140 on the work spindle 25.

As may be seen in Fig. 9, the axis of the horizontal shaft 249 is eccentrically disposed with respect to the axis of the sleeve 251 so that rotational adjustment of the sleeve will shift the axis of the shaft. Consequently, the worm 260 is adjustable with respect to the worm wheel 140 to provide for wear take-up.

Since the power to the work spindle is derived from a shaft which is a direct part of the tool spindle drive, it will be evident that the tool and work spindles will be operative or idle depending on actuation of the main clutch 161 and that the spindles will rotate in timed relationship.

The feed drive (refer to Figs. 1, 9, 11, 12)

The gear 142 on the work spindle 25 meshes, as shown in Figs. 11 and 12, with a forwardly disposed gear 261 mounted on the lower end of a vertical shaft 262 having a bevel gear 263 secured near its upper end. The bevel gear engages a bevel gear 264 carried by one end of a horizontal forwardly extending stub shaft 265 that is journaled in bearings 266 in a housing 267 fixed to the casing. A horizontal feed drive shaft 268 extends from front to rear through the casing and is driven from the horizontal shaft 265 through a train of speed change gears 269, 270, 271 and 272. The intermediate gears 270, 271 are preferably mounted on a stub shaft 273 which is supported by an arm 274 having a split collar connection 275 with a flange 276 on the bearing assembly 277 for the front end of the feed drive shaft. The rear end portion of the feed drive shaft 268 is mounted in the casing by a bearing 278. An elongated sleeve 279 surrounds the rear portion of the shaft and is pinned thereto as at 280. A bearing 281 may be interposed between the front end of the sleeve and a boss 282 on the casing. A worm 283 is formed between the ends of the sleeve for engagement with a worm wheel 284 (Figs. 9 and 12) through which the feed screw is driven.

Figure 8:
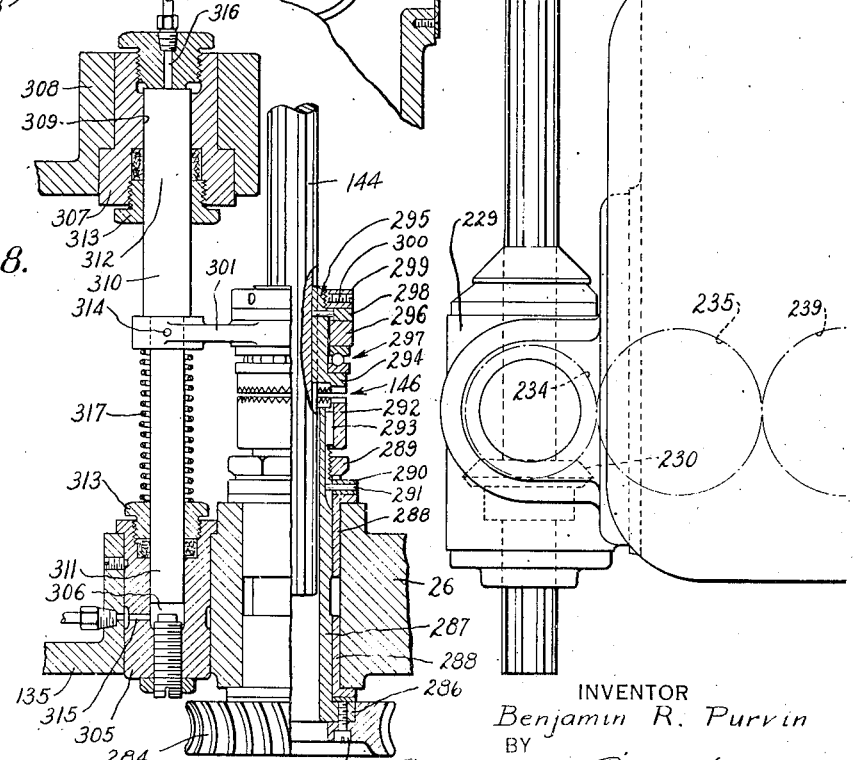
Fig. 8 shows a detail of the feed screw and feed clutch assembly and is partly in section.

The driving connection between the worm wheel 284 and the feed screw includes the feed clutch mechanism 146. Referring to Figs. 8 and 9, the worm wheel 284 is fixed as by screws 285 to a flange 286 on the lower end of a tubular shaft 287 which is rotatably supported on the work slide by interposed bearing bushings 288. The tubular shaft is held against axial movement by the flange 286 and bushing at its lower end and by a nut 289 having screw threaded engagement with the shaft and bearing against a ring 290 which is pinned, as at 291, to the tubular shaft. Above the nut, the shaft has one member 292 of a positively engageable jaw clutch rigidly secured thereto as by a key 293. The feed screw and the shaft are axially alined, and the lower end of the feed screw extends as shown in Fig. 8 downwardly into the shaft. A substantial portion of the lower end of the feed screw is splined, as shown, for slidable, non-rotative engagement by an assembly which includes the movable clutch member 294 of the clutch. In the present assembly, the member 294 has an elongated hub 295 which is encircled by a clutch shifting ring 296 disposed between a thrust bearing 297 and a fixed ring 298, the parts being adjustably maintained in this relation by a nut 299 screw threaded on the end of the hub and fixed in position of adjustment by set screws 300. A shifting arm 301 extends radially from the shifting ring for connection with means by which clutch actuation is controlled.

Engagement or disengagement of the feed clutch 146 is, in this instance, controlled by the hydraulically actuated means best shown in Fig. 8. The upper wall 135 of the casing adjacent to the tubular sleeve mounting is vertically bored to receive a fixed plug 305 having an upwardly opening cylinder 306 therein. A generally similar plug 307 is fixed to a part 308 of the work slide adjoining the feed screw and a cylinder 309 therein faces downwardly in axial alinement with the lower cylinder. A rod 310 has its opposite ends extending as pistons 311 and 312 into the cylinders 306, 309 respectively, preferably through packing glands 313. The arm 301 on the shifting collar is pinned, as at 314, to an intermediate part of the rod. Pressure fluid is admitted behind the pistons through ports 315 and 316, the present arrangement being such that admission of pressure fluid behind the upper piston 312 engages the clutch and admission of pressure fluid behind the lower piston 311 disengages the clutch. If desired, the lower piston may be of smaller diameter than the upper piston to provide a pressure differential in favor of the clutch engaging piston. Since the hydraulic system is sometimes connected to exhaust the pressure fluid from both feed clutch cylinders, the clutch is adapted to be held disengaged by such means as a spring 317 encircling the rod 310 and bearing between the shifting arm 301 and the packing gland on the lower plug 305.

The rapid traverse drive (refer to Figs. 1 and 12)

In the present machine, a rapid return or traverse movement of the work slide is obtained by a separate drive means for rotating the feed screw 144 in either direction. Thus, the upper end of the feed screw extends into the bridge 23 and has one end gear of a series of speed change gears 318, 319, 320 and 321 secured thereto. The last gear is fixed to the armature shaft of an independent rapid traverse motor 322 mounted within the upper part of the right-hand column 21.

Operation of the rapid traverse mechanism and the direction of its movement during any part of the operative cycle of the machine is controlled and determined by means to be presently described.

The coolant system (refer to Fig. 1)

A separate electric motor 323 mounted on the base 20 within the right-hand column is provided for driving a coolant pump 324 located in the base. Coolant fluid from the pump is delivered through a conduit 325 which runs upwardly along the right-hand column and terminates in a flexible end portion 326.

A discharge nozzle is arranged to be adjustably secured, as to the slide swivel 35, in position properly to discharge coolant fluid over the tool and work. Such fluid subsequently drains into a collector 328 in the base.

Operation of the coolant system is determined by controls which permit the system to be rendered inoperative or conditioned for automatic operation during the cycle.

Control means (refer to Figs. 1, 14, 16 and 17)

The control means in the present instance is disposed in a casing 329 (Fig. 1) suitably secured to the front side of the right-hand column 21. The several controls as they appear in Fig. 1 include start and stop push buttons 330 and 331 controlling switches for initiating and discontinuing machine operation; push buttons 332 and 333 for actuating switches energizable to effect respectively rapid traverse upwardly and downwardly; a selector member 334 having three positions for determining under certain operative conditions the direction of rapid traverse up or down, or an open circuit; a selector member 335 for manual control of the operation of the coolant system; a cycle lever 337 for initiating cyclic operation of the machine; a feed lever 338 for discontinuing the feeding movement of the work carriage; a motor clutch lever 339 for establishing a driving engagement through the main motor clutch 161 independently of the cycle; a stop cycle lever 340 for interrupting the cycle at any time; and a controller 341 adapted to be actuated by the work carriage or slide 26 at predetermined limits of its movement. The operations and functions of these various controls will hereinafter be more particularly described.

The controller and its associated structure, as shown in Fig. 14, embodies a shaft 342 suitably journaled in the casing with one end thereof extending from the casing to a position adjacent the work slide. This end of the shaft has an arm 343 intermediately fixed thereon which at opposite ends supports antifriction rollers 344 and 345. The arm in the neutral position of the shaft extends substantially in parallelism with the direction of carriage movement, and the rollers thereon project into the path of a pair of dogs 346, 347 mounted on a dog bar 349 on the slide 26 for adjustment along a slot 348 (Fig. 1). The dogs have beveled surfaces 350 (Fig. 14) for roller engagement and arranged to rock the shaft in opposite directions out of neutral when the upper and lower dogs engage their corresponding rollers.

Means is provided for urging the cam shaft 342 yieldingly into neutral position. To this end, the shaft has fixed thereto a pinion 351 for engagement with a short gear rack 352 on a block 353 secured, as at 354, to a rod 355. The rod is elongated to extend through an adjacent part of the casing wall and is provided with a head 356 on its outer end. A sleeve 357 is interposed between the rod and the casing wall and bears at its outer end against the rod head. The inner end of the sleeve has a flange 358 fitting a recess 359 in the wall. A helical compression spring 360 surrounds the rod and bears respectively against the flange 358 and a bearing 361 for the block end of the rod. As shown, the sleeve is longer than the width of the wall through which it extends to permit reciprocating movement of the sleeve and rod to the extent determined by the rod head 356 and flange 358.

The bearing 361 is slidably supported by a stem 362, mounted on the casing, for movement in one direction only from a neutral position, as determined by an adjustable nut 363 on the stem, to compress the spring 360. Rotational movement of the shaft in one direction (for example clockwise as viewed in Fig. 14) acts through the pinion 351 and rack 352 to shift the block 353 and slidable bearing 361 to the left against the force of the spring 360. When the shaft is released the spring urges the parts to their initial or neutral position, the limit being the abutment between the slidable bearing 361 and nut 363. Rotation of the shaft in a counterclockwise direction shifts the block 353, rod 355 and sleeve 357 to the right, again compressing the spring between the flange on the sleeve and the now stationary bearing 361. Release of the shaft returns the parts to their initial position, as determined by the engagement between the sleeve flange and the casing wall.

The shaft 342 may be considered a cam shaft since it carries a double ended barrel or sleeve-type cam 364 having at one end substantially diametrically spaced rising cam surfaces 365 circumferentially facing each other constituting a part of the cycle control system, and similar oppositely acting rising cam surfaces 366 on the other end forming a part of the rapid traverse control system. The cam shaft also carries a cam 367 in operative association with an actuator 368 for a switch 369 and another cam 370 operatively engaging the actuators 371 and 372 of a pair of switches 373, 374 respectively. The relationship of these cams to each other, to the cam shaft, and to the switches controlled thereby, will be described in the consideration of the electric control system.

The cycle lever 337 is on a shaft 375 (Fig. 14) journaled for oscillating movement between two positions. Pinned to the shaft is an arm 376 connected through linkage 377 with one end of a valve stem 378. This valve stem is a part of the cycle control valve. A second arm 379 is pinned to the cycle lever shaft, and the free swinging end of the arm is arranged to ride on the outer end of a valve stem 380. This valve stem is a part of the control valve for the main driving clutch 161. The cycle lever shaft also has secured thereto a sleeve 381 carrying a projecting member 382, such as a headed screw, for engagement with an actuator 383 for a switch 384, and a similar member 385 for engagement with an actuator 386 of another switch 387.

The sleeve also carries a projection 388 arranged to ride over a cam 389 formed at the end of a finger 390 on an arm 391. The arm is pivotally supported, as at 392, and a spring 393 is arranged to exert its tension on the end of the arm opposite the finger to hold the cam against the projection and to maintain a headed member 394 normally out of engagement with an actuator 395 for a switch 396. The swinging arm 391 has a ledge 397 near the finger 390 for engagement, when the arm is depressed by coaction between the cam and projection, by the hooked end of an extension 398 integral with a cam follower 399. Spring means 400 urges the extension toward a position for engagement with the ledge.

The cam follower 399 is fixed to a shaft 401 which is supported by the casing for oscillatory movement as well as limited axial movement. The shaft is so disposed that the cam follower 399 thereon may by axial movement of the shaft be shifted into and out of operative association with one of the rising cam surfaces 366 on the cam sleeve 364. A similar cam follower 402 is pinned to the shaft for similar movement into and out of association with the diametrically spaced surface 366, the two cam followers being so arranged (see Fig. 15) that one or the other will be selectively disposed in engagement with its associated cam by axial movement of the shaft. The two operative axial positions of the shaft are suitably determined by spaced grooves and a detent arrangement 403. The outer end of the shaft 401 extends through the front of the casing and carries a manipulating hand knob 404 (Fig. 15).

The front end of the shaft may be of reduced diameter and a sleeve 405 is interposed between the reduced end and a boss 406 on the front wall of the casing. The forwardly projecting end of the sleeve has the clutch lever 339 pinned thereto and the inwardly projecting sleeve end carries an arm 407, the free end of which extends into an elongated notch 408 (Fig. 14) appropriately formed in the clutch control valve stem 380. This arrangement permits the clutch valve to be manipulated independently of the remaining controls for effecting engagement of the main motor clutch, thus permitting the work and tool spindles to be driven momentarily as the machine is being set up. Since this machine movement is only infrequently used, the clutch lever is preferably latched normally in an idle position by such means as a spring pressed plunger 409 carried by the lever for holding engagement with a recess 410 in the casing wall. The valve stem may move freely when the arm 407 is latched.

The cycle control valve stem 378 is latched in the position to which it is shifted by such means as a latch 415 pivotally supported by a stud 416 and having a nose 417 for engagement with a notch 418 in the cycle valve stem. A spring 419 bearing against the tail 420 of the latch is arranged to urge the nose into notch engagement. The latch is released from its engaged position by means which may be manually actuated through the stop cycle lever 340, or automatically in response to a proper movement of the cam shaft 342. The stop cycle lever is on a shaft 421 supported by oscillation by the casing, as well as for axial movement between two positions determined by a detent arrangement designated 422 (Fig. 15). The stop cycle shaft carries a pair of spaced arms 423 and 424 having rollers 425 thereon for engagement with the rising surfaces 365 on the barrel cam. These rollers constitute cam followers spaced on the shaft 421 and adapted to be alternatively positioned for engagement with the associated rising cam surfaces 365, this engagement depending on the axial position of the stop cycle shaft (see Fig. 15). As shown in Fig. 15, the spring means 400, which acts on the extension 398, may also be connected to the cam follower 424 for holding the selected cam follower in engagement with the sleeve cam 364.

One of the cam followers (in this instance the cam follower 423) has an angular projection 427 engaging the tail 420 of the latch for disengageably swinging the latch when either cam follower is moved by the sleeve cam, or when the stop cycle lever is manually rocked.

The feed lever 338 is on a shaft 428 journaled in the casing for rocking movement, and an arm 429 on the shaft is connected through a linkage 430 with the stem 431 of a feed control valve. A detent device 432 holds the feed valve stem in one of two positions. The feed lever shaft also carries a headed member 433 for engagement with an actuator 434 for a switch 435.

*Hydraulic system (refer to Fig. 16)*

The hydraulic part of the control system includes a cycle control valve A, a clutch control valve B, a feed valve C, and a control valve D, the position of which is determined by the pilot valve E at the swivel slide 31. Each of these valves in the present embodiment has only two positions, namely, a starting position in which the valves are disposed as shown in Fig. 16, and operative positions into which the valves are shifted by manipulation of the various control elements associated therewith, or, as to the control valve, by the position of the pilot valve.

The pump 153, which is continuously driven when the main drive motor 150 is running, draws fluid from a sump 439 through a pump intake line 440 and delivers the fluid under pressure to a pressure line 442. The cycle valve includes a casing 441 having a series of fluid lines 443 to 453, inclusive, connected to parts therein, and a spool type plunger 454 joined to the stem 378 and having a series of grooves 455 to 459, inclusive, therein. The valve plunger is normally urged in one direction by spring means 460, and is held in its other position against the tension of the spring by the latch 415. In its idle position, as shown in Fig. 16, the pressure line 442 is connected with the port 63 of the cylinder and piston 57, 58 (through the lines 442, 445, groove 456, and lines 444, 461 to port 63).

When upon actuation of the cycle lever shaft 375, the plunger 378 is depressed and latched, the pressure line connection is reversed to admit pressure fluid to the port 62 on the advancing side of the swivel slide cylinder and piston (through lines 442, 445, groove 456, and lines 446, 462 to port 62). Also, an exhaust connection from the port 62 (comprising 462, 446, 457, 447 to a sump return line 463) is interrupted, and the port 63 is connected to the return line (through 461, 444, 455 and 443 to 463). These connections admit pressure fluid to advance or retract the swivel slide 31, and it may be noted that in the idle position of the cycle valve the pressure line is connected to maintain the swivel slide in its retracted position.

The clutch control valve structure includes a casing 464 having ports connected respectively with the pressure line 442, a line 465 and the drain line 466, and a spool type plunger 467 connected with the stem 380 and urged into an idle position by a spring 468. The plunger has a groove 469 and a clearance 470 about the spring. In the idle position, the groove 469 is positioned to block the pressure line 442, and the line 465 is connected to the drain line 466 so that the clutch 161 is disengaged. When the cycle lever shaft is actuated and latched the clutch valve plunger is simultaneously shifted, and a pressure connection is established to the main drive clutch cylinder 173 (through 442, 469, 465, 182, 177 and 176). Thus the driving connection between the main driving motor and the driving transmission is established and the tool and work spindles are set in motion. As previously mentioned, manipulation of the clutch lever will manually shift the clutch valve plunger to permit the tool and work spindles to be operated independently of the rest of the control system.

The pilot valve is a reversing valve, and its casing 123 has ported connections with the pressure line 442, with lines 471, 472, and with a relief line 473. The spool type plunger 474 has grooves and end clearances 475, 476 and 477. In the idle position of the machine, the valve connects the pressure line 442 with one end of the control valve (through 475 and 471), and the relief line 473 with the opposite end of said control valve (through 472 and 477). The plunger 478 of the control valve is freely mounted in the valve casing 479 for movement to either end of the casing as pressure fluid is admitted to the opposite end. The control valve plunger has grooves 484, 485 and 486, and the casing is ported to communicate with pressure line 442, at the ends with lines 471, 472 from the pilot valve, with lines 450, 452 from the cycle control valve and near either end with the drain line 463.

When the pilot valve is in idle position, as shown, the control valve plunger 478 is held by pressure fluid in a position in which a connection is established to the cycle control valve (through 442, 485 and 452), but this line is blocked by a land 487 on the cycle valve plunger.

The control valve during the cycle determines and, in effect, times the admission of pressure fluid to actuate the swivel slide clamping means and the feed clutch 292, 294. The feed valve controls the flow to these elements. The feed valve has a casing 488 connected through ports with the lines 449 and 451 from the cycle control valve, with other lines 489, 490, and, at one end and near both ends, with the return line 463. The spool type plunger 491 which is fixed to the stem 431, has grooves 492 and 493.

The feed control valve is normally located in its operative position, that is to say, in a position in which it enables operation of the feed and clamping of the swivel slide. Its second position is one to which it is shifted by the intentional hand manipulation of the feed lever, and in this position the valve prevents feed and clamping.

The line 489 is common to the unclamping cylinders 69 on the swivel slide 31 and the feed clutch disengaging cylinder 306. The line 490 is common to the clamping cylinders 70 and the feed clutch engaging cylinder 309. In the operative position of the feed valve, as shown, and with the cycle control valve in its idle position, the unclamping cylinders of the clamping devices and the disengaging cylinder of the feed clutch are connected with the drain line (through 489, 492, 451, 459, 450 and 484 to 463). Also, the clamping cylinders and the engaging cylinder of the feed clutch are connected with the drain line (through 490, 493, 449, 458 and 448 to 463).

After the cycle lever shaft has been actuated to depress and latch the cycle control valve stem 378, the last portion of the advancing movement of the swivel slide toward its operative position will, through the linkage 120, 121, 122, shift the pilot valve. The responding movement of the control valve effects the admission of pressure fluid to the actuating mechanism which clamps the swivel slide 31 in its advanced position and initiates operation of the feed screw (from 442 through 450, 458, 449, 493 and 490 to cylinders 70 and 309). The hydraulic means for unclamping the clamping mechanism and disengaging the feed clutch remain connected to the return line (from cylinder 69 and 306 through 489, 492, 451, 459, 452 and 486 to return line 463).

The machine and control elements remain in this condition until the cut is completed or the feed part of the cycle interrupted by a manipulative act. Return of the parts to their idle position is initiated by tripping the latch 415 to permit the cycle control valve and the clutch valve to be moved to their idle positions by the springs 460 and 468, respectively. The shift of the clutch control valve again blocks the pressure line 442 from the cylinder 173 and connects the latter with the return line (through 465, 470 and 466). The connections to the feed clutch cylinders 306 and 309 and to the clamping cylinders 69 and 70 are reversed as the cycle control valve plunger 454 returns to its idle position to connect the unclamping cylinders 69 and feed clutch disengaging cylinder 306 with the pressure fluid line (through 442, 450, 459, 451, 492 and 489), while the clamping cylinders 70 and the feed clutch engaging cylinder 309 are connected to the return line 463 (through 490, 493, 449, 458, and 448). The connections leading to the swivel slide cylinder 57 are also reversed in the cycle control valve, the port 63 to the retracting side of the piston being then connected with the pressure line 442 (through 445, 456, 444 and 461) and the port 62 to the advancing side of the piston being connected with the return line 463 (through 447, 457, 446 and 462).

Disengagement of the main clutch stops rotation of the spindles. As the swivel slide 31 reaches its retracted position the pilot valve is shifted to reverse the connections to the control valve and return this valve to its idle position in which, as above mentioned, the unclamping and clamping cylinders and the feed clutch engaging and disengaging cylinders are all connected with the return line 463.

When the feed control valve is shifted by manual actuation of the feed lever, the connections through the valve are reversed. Hence, if the feed lever is actuated during a cycle and while the swivel slide 31 is clamped in advanced position and the feed clutch engaged, the reversel will admit pressure fluid for unclamping the swivel slide and disengaging the feed clutch (through 449, which is then connected to the pressure line, 492 and 489), and will exhaust the slide clamping and feed clutch engaging cylinders (through 490 and 493 to 463). Should the feed lever be shifted from its operative position at any time other than when the machine is in cycle, a connection of both common lines 489, 490 to the return line will result (from line 489, through 492, 449, 458, 448 to 463, and from line 490 through 493 to 463).

*Electric control (refer to Figs. 16 and 17)*

The electrical control system embodies circuits for energizing and deenergizing the main driving motor, the coolant pump motor, and the rapid traverse motor, and with particular reference to the latter, includes selectively energizable circuits therefor which are enabled or disabled depending on the operative condition of the machine and, in part, on connections established manually by the operator.

In the present embodiment, the reference characters L1, L2 and L3 indicate the three electric power lines from a three phase source of supply. Only the lines L1 and L3 are used in the control system. An energizing circuit for the main driving motor 150 is controlled by a main relay switch MR having contacts CR1, CR2 and CR3 for the power lines; contacts CR4 for connecting the power line L2 to the rapid traverse motor 322; and contacts CR5 in a holding circuit for the relay winding MRW. The starting push button 330 controls the normally open switch S1 and the stop push button 331 controls a normally closed switch S2, and these switches are connected in series in the energizing circuit of the relay winding MRW to close the circuit when the starting push button is actuated and open the holding circuit when the stop push button is depressed.

The rapid traverse motor 322 is capable of operation in reverse direction and energization thereof is immediately controlled by a pair of relay switches R1 and R2, the switch levers of which are linked together as at 500 to insure alternate operation. In the relay switch R1 are contacts C11 and C12 for closing a circuit from the power lines L1 and L3 to energize leads 501 and 502 leading to the rapid traverse motor. It will be considered that the circuit controlled by this relay switch effects rapid traverse movement in an upward direction. The other relay switch R2 has a similar pair of contacts C21 and C22 arranged to connect the power lines L1, L3 to the motor lines 501, 502 in a reverse direction. This circuit will effect rapid traverse movement downwardly. Each of the switches R1 and R2 include holding contacts C13 and C23, respectively, for establishing a holding circuit through energizing windings W1 and W2 of the relay switches. Each relay switch also includes a pair of normally closed contacts C14, C24, respectively, which are connected in series and control energization of the winding W3 of a time delay relay R3.

The time delay relay is a part of the system for controlling the operation of a brake for stopping rotation of the rapid traverse motor at the moment the energizing circuit to the motor is broken. In this instance the braking means preferably includes a motor brake 503 which is held in applied condition by springs 504 and is maintained out of brake-applying condition by energization of a solenoid 505. The solenoid is connected to the power mains through contacts C41, C42 of a relay switch R4 having an energizing winding W4. Energization of this winding is controlled by contacts C31 on the time delay relay R3. The arrangement is such that when the machine is in operation the solenoid control contacts C41 and C42 are closed, and the brake held inoperative. When either of the rapid traverse relay switches moves to open contacts C14 or C24, the time delay relay R3 is deenergized, and a holding circuit for the solenoid switch relay R4 is established through the then closed contacts C13 or C23. When subsequently the closed rapid traverse switch is opened to break the rapid traverse motor circuit, the holding circuit of the solenoid relay is also broken to deenergize the brake solenoid 505 and permit the springs 504 to set the brake. At approximately the same time the holding circuit of the time delay relay R3 is closed to reestablish the solenoid control relay holding circuit. However, the time delay relay is set to retard closing the circuit controlled thereby for a period sufficient to enable the brake to stop the rapid traverse motor. Consequently, the solenoid brake is applied only after deenergization of the rapid traverse motor and then only momentarily. It is therefore not possible to impose the load of the brake on the feed screw during a feeding operation.

Energization of the windings of the relays R1 or R2 is selectively controlled by a plurality of switches, certain of which are arranged for manual actuation and others for correlation with various parts of the machine and the control means. The switch 127 which is responsive to swivel slide movements is of the single pole, double throw type and includes contacts 506 and 507 which are closed respectively when the swivel slide is in its retracted and advanced positions. The contacts 506 control a circuit by which rapid traverse movement may be obtained in either direction by manual control. The contacts 507 control a circuit by which the rapid traverse movement is automatically initiated at the end of a cutting operation to return the work carriage to its starting position.

Considering manual operation, the rapid traverse up and rapid traverse down push buttons 332 and 333 are arranged to close normally open switches 508 and 509, respectively, which selectively control circuits to the energizing windings W1 and W2 of the rapid traverse up and down relays R1 and R2, respectively. To avoid damage to the machine which might occur, should the operator unintentionally depress either rapid traverse button when the work carriage is at the end of its travel in the corresponding direction, means is provided which disables the circuit by which the work slide 26 might be moved beyond either limit. In this instance this result is obtained by interposing the switch 369 (of the normally open type) in the circuit between the manual rapid traverse up switch 508 and the rapid traverse relay winding W1. When this switch is open the relay winding cannot be energized by manipulation of the push button 332. Similarly, the switch 374 of the same type is interposed in the circuit between the manual rapid traverse down switch 509 and the rapid traverse relay winding W2. The switches 369 and 374 are held closed by the cams 367 and 370 (Figs. 14 and 17) which have high points 510, 511, respectively, disposed, in the neutral position of the cam shaft, to engage the switch actuators 368 and 372 and hold the switches closed. The cams are so arranged that rotary movement of the cam shaft 342 in one direction or the other will shift the high point on one cam out of engagement with its switch actuator, while maintaining engagement between the other cam and its associated actuator. Thus when the cam shaft has been rocked by either limit dog on the work slide 26, one or the other of the switches 369 and 374 will be opened, depending on the direction of rocking movement of the cam shaft. As shown, the switches and their actuating cams are so arranged that rocking of the cam shaft by the lower dog 347 at the limit of upward travel of the work carriage opens the switch 369, while movement of the cam shaft by the upper dog 346 opens the other switch 374.

Rapid traverse cannot be manually initiated while the feed lever is in its operative position unless the cycle lever shaft 375 is in its inoperative position and the swivel slide 31 retracted. The member 433 on the feed lever in the operative position thereof is arranged to engage the switch actuator 434 to close contacts 512 of the single pole double throw switch 435 and establish a circuit between both of the manual rapid traverse switches 508, 509 and the normally open switch 384, the condition of which is determined by the position of the cycle lever shaft. This latter switch 384 is closed by the member 382 only when the cycle lever shaft is in its idle position, and the cricuit controlled by this switch is the rapid traverse circuit which is closed by the switch 506 only when the swivel slide 31 is in its retracted position. These contacts 506 are connected in series with the switch 384 (Fig. 17) and contacts 512 of switch 435 and with the safety switch 373 which controls the connection of the circuit with the power line L1.

The safety switch is of the normally open type and is held closed by engagement of the actuator 371 with a high point 513 on the cam 370. The purpose of the safety switch will be hereinafter more fully described.

A second circuit enabling manual control may be set up when the swivel slide is advanced and the opposite contacts 507 of the switch 127 closed. This circuit can only be energized when the feed lever has been shifted to the position in which it disengages the feed clutch and unclamps the swivel slide. Such movement of the feed lever opens contacts 512 and permits the opposite contacts 514 to close, thereby establishing a control circuit (which also includes the safety switch 373) through the manual rapid traverse switches 508, 509. The purpose of this circuit is to enable an operator in setting up the machine to produce a rapid jogging movement of the feed slide.

The automatic rapid traverse movement is under the control of the drum cam 364 on the cam shaft and mechanism associated therewith. The three-position directional switch 334 has a movable contactor engageable with a terminal 515 for the rapid traverse up relay winding W1 and another terminal 516 connected with the rapid traverse down relay winding W2. In the third position, both circuits are open and the automatic rapid traverse system is inoperative. Connected in series with the directional switch 334 is the switch 396, which through the control mechanism previously described will be closed and latched in that condition when the cycle lever 337 is moved to start the cycle. This conditions the circuit for automatic rapid traverse in the direction determined by the setting of the directional switch 334 and the switch 396 will remain latched until released by movement of the cam shaft at the end of rapid traverse movement in the selected direction. The switch 396 is connected in series with the switch 384 to permit energization of the circuit only when both switches are closed, but the switch 384 is closed only when the cycle lever has been returned to its idle position upon completion of a cut. It is the closing of the switch 384 which establishes the selected circuit to energize the rapid traverse motor.

The safety switch 373 constitutes means for breaking any of the rapid traverse circuits in the event of failure of some circuit breaking switch (the switches 369, 374 and 396) to open at the extreme limits of movement of the feed slide. Thus the high point 513 on the cam 370 is of ample length to hold the safety switch closed while the cam shaft rocks the necessary distance to open the switches 369, 374 or 396. However, should any of these switches fail to open when it should, the resulting abnormal rocking movement of the cam shaft will carry the high point 513 beyond the switch actuator 371 and open the safety switch 373.

The circuit of the coolant motor is closed by a relay switch R5 having contacts C51, C52, and C53 establishing connection between the motor windings and the power lines L1, L2, and L3, respectively. The energizing winding W5 of the relay is connected in a circuit which includes the manual off-and-on switch 335 and the control switch 387 which is normally open but has its actuating members arranged to automatically close it whenever the cycle lever is shifted to initiate a cycle.

*Machine operation*

In describing the operation of the present machine it will be considered first that the various necessary machine adjustments of the tool spindle and of the gears have been made and that the machine is ready for operation. When the main driving motor is not running, no part of the mechanism can be caused to operate. To start the main driving motor the starting push button 330 is depressed momentarily to energize the main relay winding MRW (through the circuit L1, 520, 521, 331, 522, 330, 523, winding MRW, 524, 525, to line L3). Closing the relay switch establishes a motor driving circuit through the contacts CR1, CR2 and CR3 to leads L11, L12 and L13 connected with the motor 150. Contacts CR4 connect main line L2 to the line 526 leading to one of the windings of the rapid traverse motor 322, and contacts CR5 establish a circuit for holding the main switch relay MR (through the circuit L1, 520, 521, 331, 522, contacts CR5, 523, relay winding MRW, 524, 525 to L3). The holding circuit of the time delay relay R3 by which the solenoid relay switch R4 is held closed when the rapid traverse motor is idle, is always established when the machine is connected with the source of power (through the circuit L1, 520, 529, W3, 530, contacts C24, of the rapid traverse down relay R2, 531, contacts C14 of the rapid traverse down relay R1, 532, 525 to L3) which circuit energizes the solenoid brake relay R4 (through the circuit L1, 520, 527, W4, 528, time delay relay contacts C31, 525 to L3). The rapid traverse brake solenoid 505 is therefore energized and maintains the solenoid brake inoperative (through the circuit L1, 520, 533, 534, contacts C42, 535, solenoid 505, 536, contacts C41, 537, 525 to L3).

Presuming that the machine is set to feed upwardly and return rapidly downwardly, movement of the cycle lever shaft from its idle to its operative position (clockwise in Fig. 16), will depress and latch the cycle control valve stem 378 and the clutch valve stem 380 to establish a driving connection through the main driving clutch 161, and to advance the swivel slide 31 and the tool T into operative relation with respect to the path of the work. Movement of the cycle lever shaft also closes and latches switch 396, opens switch 384 and closes coolant control switch 387. If the coolant manual control switch 335 is closed a circuit for the coolant motor relay switch is closed (through the circuit L1, 520, 533, 387, 539, 335, W5, 540 to L3) to close the contacts C51, C52, and C53 of the relay switch and establish a motor energizing circuit from the power lines L1, L2, L3, respectively, through L21, L22; L23, L24; L25, L26.

As the swivel slide 31 reaches its advanced or operative position, the pilot valve member 474 is reversed to shift control valve member 478 and admit pressure fluid to clamp the swivel slide and to effect engagement of the feed clutch 292, 294 as previously described. It will be understood that when the machine is set up for cyclic operation the feed lever is in its operative position to permit such closing of the feed clutch, and clamping of the swivel slide.

Simultaneously with reversal of the pilot valve E the swivel slide 31 throws the switch 127 to set up a circuit through the contacts 507 by which a rapid traverse movement may be obtained while the swivel slide is advanced. This circuit will be considered later.

The feeding movement of the work slide 26 thus initiated continues until the cut is completed, following which the lower dog 347 on the carriage engages the lower roller 345 on the cam shaft arm 343 to rock the cam shaft 342 in one direction (clockwise as shown in the drawings). This rocking movement rotates the cam drum 364 on which the cam surfaces are so disposed (see Fig. 13) that the cam follower 425 is moved to release the cycle control valve stem 378 for return to its initial position. The cycle control valve A in this position reverses the pressure fluid connections to the swivel slide cylinder 57 to retract the swivel slide 31 and at the same time reverses the connections to the clamping and feed clutch mechanisms to unclamp the swivel slide and disengage the feed clutch. Also, the clutch control valve B is permitted to return to its initial position to effect disengagement of the main drive clutch 161. The return movement of the cycle lever shaft also opens the control switch 387 in the coolant circuit to stop the coolant motor and closes switch 384 to set up the rapid traverse circuit for returning the work slide 26 to its initial position when the circuit is energized at the end of the retracting movement of the swivel slide 31.

The same rocking movement of the cam shaft 342 opens the switch 369 to disable the circuit (to be later described) which would otherwise enable a rapid traverse movement in the same direction of feed by manual manipulation of the switch 508. The latched switch 396 remains closed when the cam shaft is rocked in this direction since the rising cam surface 366 (Fig. 13) for effecting release of the latch is disposed to actuate the cam follower 402 only upon rocking movement of the cam shaft in an opposite (or counterclockwise) direction.

As the swivel slide 31 reaches its retracted position the pilot valve E is shifted to return the control valve D to its initial position, thereby releasing pressure fluid entirely from the clamping and feed clutch controlling pistons and cylinders. The switch 127 is also reversed to close the contacts 506 and establish the circuit for effecting the rapid traverse movement in a return direction (through the circuit L1, 520, 533, 543, contacts 544 of switch 373, 545, 506, 546, contacts 547 of switch 384, 548, 396, directional switch 334 to 516, 549, W2, 550, 551, 525 to L3). Since the direction of feed was upwardly the rapid traverse directional switch is set to establish a downward return movement. Energization of the relay winding W2 closes the rapid traverse down-relay R2 and establishes a driving circuit for the rapid traverse motor (through 520, 552, C22 to 502, and through 525, 553, C21 to 501). Closing of the relay also opens contacts C24 to break the holding circuit of the time delay relay R3, and contacts C23 are closed to set up a second holding circuit around the time delay relay (through the circuit L1, 520, 527, W4, 528, 563, C23, 551, 525 to L3). The solenoid therefore remains energized to prevent traverse motor brake engagement.

The rapid traverse movement continues until the upper dog 346 strikes the upper roller 344 on the cam shaft arm 343 to rock the cam shaft 342 in a counterclockwise direction. The rising surface 366 on the cam drum 364 acts on the cam follower 402 to release the latch and open switch 396, thus deenergizing the winding of the rapid traverse relay R2 and breaking the driving circuit of the traverse motor. The opening movement of the rapid traverse down relay R2 breaks the holding circuit of the solenoid brake relay R4 and permits this switch to open. Deenergization of the solenoid 505 releases the brake for application by its associated springs 504 and the rapid traverse motor is quickly brought to a stop. Thereafter the time delay relay R3, the holding circuit of which has been reestablished by opening movement of the rapid traverse down relay, closes again to energize the winding of the solenoid brake relay R4 and close the energizing circuit of the brake solenoid.

In the event the direction of feed is in a reverse direction than just considered (i. e. downwardly) a circuit through the rapid traverse up relay R1, which is connected in parallel with the down relay R2, is established through the directional switch terminal 515. Parallel leads have therefore been given the same reference numerals and the reverse motor connections are indicated by the exponent "a". Otherwise the operation is unchanged except that at the end of the cycle the switch 369 is open and switch 374 is closed.

It will be noted that when the cam shaft 364 has been rocked by the descending dog 346 and further operation of the machine discontinued, the dog and roller remain engaged and the double acting cam is positioned to prevent the switch 396 from again being closed and latched until after the dog has moved upwardly to release the cam shaft for return to its neutral position. In this terminal position of the cam shaft, the switch 374 is open to prevent manual manipulation of the switch 509 by which further rapid traverse movement in the same direction (downwardly) might be effected.

Should the operator wish to effect rapid traverse movement of the work carriage independently of the cyclic control, he may do so by manipulation of the switches 508 or 509. Thus, presuming that the work slide 26 is positioned intermediate its extreme limits of movement so that both switches 369 and 374 are closed, manipulation of either manual control switch 332 or 333 to close its associated circuit will produce rapid traverse movement of the work slide in a corresponding direction. For example, closing the manual rapid traverse up switch 508 closes the rapid traverse up relay R1 (through a circuit L1, 520, 533, 543, 544, 545, 506, 546, 547, 548, 555, 512, 556, 508, 557, contacts 558 of switch 369, and lead 559 which connects in parallel with lead 549a to W1 and establishes the relay energizing circuits and the traverse motor as has been described). Depression of the manual rapid traverse down switch 509 energizes a parallel circuit which includes in addition, contacts 560 of the cam closed switch 374 and the energizing winding W2 of the rapid traverse down relay.

In either of these circuits deenergization of the relay winding occurs when the actuated manual switch 508 or 509 is released, and thereafter the solenoid brake and the time delay relays operate, as has been described, momentarily to set the brake on the rapid traverse motor. It will be evident that if the work slide is stopped at either limit of movement, the engagement between the corresponding limit dog and the associated cam shaft roller will hold the cam shaft in a rocked condition in which one or the other of the switches 369 or 374 will be opened, depending on the direction in which the cam shaft has been moved. Whichever switch is opened will disable the manual rapid traverse circuit through the associated manual switch.

Should the operator during a cycle wish to stop the cycle and effect a return of the machine elements to their initial position, he may do so by actuating the stop cycle lever 340 to release the latch 415 from holding engagement with the cycle control valve stem. The resulting machine movements, including the rapid return of the work slide, follows the same as though the latch had been released by movement of the cam shaft following completion of the cut.

Should the operator desire momentarily to interrupt the feed without stopping the cycle (as for checking the relationship of the tool and work, or making a further adjustment), he may do so by movement of the feed lever 338 out of its operative position. This shifts the feed control valve to reverse the pressure fluid connections to the clamps and feed clutch devices, thereby unclamping the swivel slide and disengaging the feed clutch. The swivel slide, however, remains in its extended position. This movement of the feed lever also opens contacts 512 and closes contacts 514 of the switch 435 to set up a manual rapid traverse control circuit which may be established through either manual control switch (it being assumed that both cam switches 369 and 374 are closed). In this condition, the portion of the operating circuit between the manual control switches 508 and 509 and the line L3 is the same as that previously described. On the other side of the manual switches 508 and 509 the circuit is completed through the common lead 556, contacts 514, lead 561, contacts 507 of switch 127 (which are closed in the extended position of the swivel slide), lead 545, contacts 544, and leads 543, 533, 520 to Ll.

It will be noted that the safety switch 373 is common to all of the rapid traverse circuits and consequently will open any established rapid traverse circuit should the switches 369, 374 and 396 fail to break their associated circuits upon the initial movement of the cam shaft.

The hydraulic and electrical control systems will function in the manner described above regardless of the direction of rotation of the tool and work spindles, or direction of feed. The parts have been shown in Figs. 14 and 15 in the positions assumed when the feed is in an upward direction. If the direction of feed is to be reversed, the stop cycle shaft 421 and the shaft 401 on which the cam followers 425 and 399, 402 are respectively mounted are shifted axially to effect engagement of the opposite ones of the pairs of cam followers on the shafts in operative relation to the rising cam surfaces on the double ended drum cam 364. Hence, the effect of the rocking movement of the cam shaft 342 produced by the upper and lower dogs 346 and 347 will be reversed so that movement of the cam shaft 342 in a counterclockwise direction by the upper dog will release the cycle control valve stem 378 and the clutch control valve stem, while movement of the cam shaft in a clockwise direction will open the switch 396 and stop the cycle.

I claim as my invention:

1. A hobbing machine having, in combination, a fixed frame including horizontally spaced vertically extending columns and top and base members rigidly connecting said columns and defining therewith a central opening, a first spindle, means on one of said columns supporting said first spindle for vertical movement in said opening, a second spindle, means on the other column for supporting said second spindle for horizontal movement in said opening into and out of operative relation to said first spindle, and means for driving said spindles and for effecting the translatory movements of said spindles in said opening.

2. A hobbing machine having, in combination, a frame including parallel vertical columns and top and base members rigidly connecting said columns and defining an opening therewith, a first spindle, means on one of said columns supporting said first spindle for vertical movement in said opening, a second spindle, means on the other columns for supporting said second spindle for horizontal movement into and out of operative relation to said first spindle, and means for driving said spindles and for effecting the translatory movements of said spindles in said opening including a feed screw depending from said top member for vertically moving said first spindle.

3. A hobbing machine having, in combination, a frame including horizontally spaced vertical columns and a top member rigidly connecting said columns, a first spindle, means on the inner face of one of said columns for supporting said first spindle for vertical movement, feed means depending from said top member for effecting such vertical movement, a second spindle, means on the inner face of the other column for supporting said second spindle for horizontal movement into and out of operative relation to said first spindle, means for driving said spindles and for effecting translatory movements of said spindles in said opening, and rapid traverse drive means connected with said feed means within said top member.

4. A hobbing machine having, in combination, a frame including horizontally spaced vertically extending columns and top and base members rigidly connecting said columns and defining therewith a central opening, a first spindle, means on one of said columns supporting said first spindle for vertical movement in said opening, a second spindle, means on the other column for supporting said second spindle for horizontal movement in said opening into and out of operative relation to said first spindle, means for adjustably limiting the extent of such last mentioned movement, means on said supporting means for adjusting said second spindle rotatably on and transversely of the line of movement thereof, and means for driving said spindles and for effecting the translatory movements of said spindles in said opening.

5. A hobbing machine having, in combination, a base supporting a pair of parallel rising columns, a bridge rigidly connecting the tops of said columns, said columns, bridge and base defining a confined space, a carriage mounted on the inner face of one of said columns for vertical translation, a first spindle mounted on a vertical axis on said carriage, feed means depending from said bridge and operatively engaging said carriage, supporting means mounted on the other column for horizontal movement into and out of said space, means for effecting such movement of said supporting means, a second spindle mounted on said supporting means for movement therewith into and out of a hobbing relation to said first spindle, adjustable means for determining the extent of movement of said supporting means, means for adjusting said second spindle axially, means for adjusting said second spindle radially with respect to the line of movement of said supporting means, a prime mover housed within the column on which said second spindle is mounted, normally disengaged driving connections between said prime mover and both of said spindles and said feed means, means for moving said second spindle into such operative relation and for establishing the driving connections to said spindles, means responsive to the movement of said second spindle into operative relation to said first spindle for clamping said supporting means and for establishing the driving connection to said feed means, means for discontinuing said driving connections upon the movement of said second spindle out of operative relation to said first spindle, normally disengaged rapid traverse drive means connected with said feed means within said bridge, means operable upon disengagement of the driving connections between said prime mover and said feed means for establishing a driving connection between said rapid traverse drive means and said feed means, and means for controlling machine movements manually and independently of the operative movements dependent upon the position of said second spindle.

6. A hobbing machine having, in combination, a base supporting a pair of parallel rising columns, a bridge rigidly connecting the tops of said columns, a carriage mounted on the inner face of one of said columns for vertical translation, a first spindle mounted on a vertical axis on said carriage, feed means mounted on said bridge and operatively engaging said carriage, supporting means mounted on the other column for horizontal movement into and out of the space defined by said columns, bridge and base, means for effecting such movement of said supporting means, a second spindle mounted on said supporting means for movement with said supporting means into and out of hobbing relation to said first spindle, adjustable means for determining the extent of movement of said supporting means, a prime mover housed within the column on which said second spindle is mounted, normally disengaged driving connections between said prime mover and said spindles, means for establishing such driving connections, means responsive to the movement of said second spindle into operative relation to said first spindle for clamping said supporting means and for establishing a driving connection from said prime mover to said feed means, means for discontinuing said driving connections upon the movement of said second spindle out of operative relation to said first spindle, rapid traverse drive means connecting with said feed means within said bridge, and means operable upon disengagement of the driving connections between said prime mover and said feed means for actuating said feed means by said rapid traverse drive means.

7. A hobbing machine having, in combination, a base supporting a pair of parallel rising columns, a bridge rigidly connecting the tops of said columns, a carriage mounted on the inner face of one of said columns for vertical translation, a first spindle mounted on said carriage, feed means depending from said bridge and operatively engaging said carriage, supporting means mounted on the other column for horizontal movement into and out of the space defined by said columns, bridge and base, means for effecting such movement of said supporting means, a second spindle mounted on said supporting means for movement with said supporting means into and out of a hobbing relation to said first spindle, a prime mover housed within the column on which said second spindle is mounted, normally disengaged driving connections between said prime mover and both of said spindles and said feed means including means for establishing said driving connections, means for discontinuing said driving connections upon the movement of said second spindle out of operative relation to said first spindle, rapid traverse drive means connected with said feed means within said bridge, and means for establishing the drive between said rapid traverse drive means and said feed means.

8. A hobbing machine having, in combination, a base supporting a pair of parallel rising columns, a bridge rigidly connecting the tops of said columns, said columns, bridge and base defining a space, a carriage mounted on the inner face of one of said columns for translation relative thereto, a first spindle mounted on a vertical axis on said carriage, feed means operatively engaging said carriage, supporting means mounted on the other column for movement inwardly and outwardly of said space, means for effecting such movement of said supporting means, a second spindle mounted on said supporting means for movement with said supporting means into and out of a hobbing relation to said first spindle, a prime mover, normally disengaged driving connections between said prime mover and both of said spindles and said feed means, means operable as said second spindle moves into operative relation to said first spindle for establishing the driving connections to said spindles and to said feed means, means for discontinuing said driving connections upon the movement of said second spindle out of operative relation to said first spindle, and rapid traverse drive means adapted to be drivingly connected with said feed means within said bridge.

9. A hobbing machine having, in combination, a base supporting a pair of parallel rising columns, a carriage mounted on the inner face of one of said columns for vertical translation, a first spindle mounted on a vertical axis on said carriage, feed means for said carriage, supporting means mounted on the other column for horizontal movement into and out of the space between said columns, means for effecting such movement of said supporting means, a second spindle mounted on said supporting means for movement with said supporting means into and out of a hobbing relation to said first spindle, a prime mover, normally disengaged driving connections between said prime mover and both of said spindles and said feed means, means for establishing said driving connections including means responsive to the movement of said second spindle into operative relation to said first spindle for establishing the driving connection to said feed means, and means for discontinuing said driving connections upon the movement of said second spindle out of operative relation to said first spindle.

10. A hobbing machine having, in combination, a base supporting a pair of parallel rising columns, a carriage mounted on the inner face of one of said columns for vertical translation, a first spindle mounted on said carriage, supporting means mounted on the other column for movement into and out of the space between said columns, a second spindle mounted on said supporting means for movement with said supporting means into and out of a hobbing relation to said first spindle, a prime mover, normally disengaged driving connections between said prime mover and both of said spindles, a control member operable to effect movement of said second spindle into operative relation to said first spindle and to establish the driving connections to said spindles, and means for discontinuing said driving connections upon the movement of said second spindle out of operative relation to said first spindle.

11. In a machine tool, the combination of a base, a first spindle mounted thereon for cutting and return translation, a second spindle mounted thereon for movement into and out of operative relationship to the line of movement of said first spindle, hydraulic means for effecting said movements of said second spindle, electrical means for effecting the translation of said first spindle, a prime mover for rotating said spindles, and hydraulic means responsive to the movement of said second spindle into said operative relationship to clamp said second spindle in such position and to establish a driving connection for effecting the cutting movement of said first spindle.

12. In a machine tool, the combination of a base, a first spindle mounted thereon for cutting and return movements, a second spindle mounted thereon for movement into and out of operative relationship to the line of movement of said first spindle, hydraulic means for effecting said movements of said second spindle, electrical means for effecting the movements of said first spindle, a prime mover for rotating said spindles, and hydraulic means responsive to the movement of said second spindle into said operative relationship to establish a driving connection for effecting the cutting movement of said first spindle.

13. In a machine tool, the combination of a base, a first spindle mounted thereon for cutting and return movements, a second spindle mounted thereon for movement into and out of operative relationship to the line of movement of said first spindle, hydraulic means for effecting the aforesaid movements of said second spindle, electrical means for effecting the movements of said first spindle, a prime mover for rotating said spindles, hydraulic means responsive to the movement of said second spindle into said operative relationship to clamp said second spindle in such position and to establish a driving connection for effecting the cutting movement of said first spindle, and means for unclamping said second spindle and interrupting the said driving connection while said second spindle is advanced.

14. In a machine tool, the combination of a base, a first spindle mounted thereon for cutting and return movements, a second spindle mounted thereon for movement into and out of operative relationship to the line of movement of said first spindle, hydraulic means for effecting the aforesaid movements of said second spindle, electrical means for effecting the movements of said first spindle, a prime mover for rotating said spindles, hydraulic means responsive to the movement of said second spindle into said operative relationship to clamp said second spindle in such position and to establish a driving connection for effecting the cutting movement of said first spindle, means for unclamping said second spindle and interrupting the said driving connection while said second spindle is advanced, and manually operable means for establishing a driving connection for return movement of said first spindle conditioned for operation when the unclamping and interrupting means is actuated.

15. In a machine tool, the combination of a base, a first spindle mounted thereon for cutting and return translatory movement, a second spindle mounted thereon for movement into and out of operative relationship to the line of movement of said first spindle, hydraulic means for effecting the aforesaid movements of said second spindle, means for effecting the translatory movements of said first spindle, a prime mover for rotating said spindles, means responsive to the movement of said second spindle into said operative relationship to establish a driving connection for effecting the cutting movement of said first spindle, and means for establishing a driving connection for effecting the return movement of said first spindle including control means operable to establish such a driving connection only when said second spindle is retracted.

16. In a machine tool, the combination of a base, a first spindle mounted thereon for cutting and return movements, a second spindle mounted thereon for movement into and out of operative relationship to the line of movement of said first spindle, hydraulic means for effecting the aforesaid movements of said second spindle, means for clamping said second spindle in its said operative relationship, electrical means for driving said first spindle with a cutting movement, separate control means for driving said first spindle with a return movement, and means for determining the operative condition of said separate control means by the in or out positions of said second spindle.

17. In a machine tool, the combination of a base, a first spindle mounted thereon for cutting and return translatory movement, a second spindle mounted thereon for movement into and out of operative position relative to the line of movement of said first spindle, hydraulic means for effecting the aforesaid movements of said second spindle, electrical means for rotating said spindles and for effecting the translatory movements of said first spindle, cycle initiating means manipulable by the operator, valve means conditioned by manipulation thereof to effect movement of said second spindle into said operative position, other valve means operable as said second spindle reaches said position to clamp said second spindle in such position and to establish a drive for effecting movement of said first spindle in a cutting direction, and an electric circuit conditioned for energization by manipulation of said cycle initiating means for controlling the movement of said first spindle in a return direction.

18. In a machine tool, the combination of a base, a first spindle mounted thereon for cutting and return movement, a second spindle mounted thereon for movement into and out of operative relation to said first spindle, hydraulic means for effecting the aforesaid movements of said second spindle, electrical means for effecting the translatory movements of said first spindle, valve means manipulable to effect movement of said second spindle into said operative relation, other valve means operable as said second spindle reaches said position to establish a drive for effecting movement of said first spindle in a cutting direction, and an electrical circuit for controlling the movement of said first spindle in a return direction.

19. In a machine tool, the combination of a base, a first spindle mounted thereon for cutting and return movement, a second spindle mounted thereon for movement into and out of operative relation to the line of movement of said first spindle, hydraulic means for effecting the aforesaid movements of said second spindle, electrical means for effecting the translatory movements of said first spindle, reversing valve means controlling movements of said second spindle into and out of said operative relationship, other valve means operable as said second spindle reaches said position to establish a drive for effecting movement of said first spindle in a cutting direction, an electrical circuit for controlling the movement of said first spindle in a return direction, and means for establishing said circuit when said second spindle reaches its inoperative relation.

20. In a machine tool, the combination of a base, a first spindle mounted thereon for cutting and return translation, a second spindle mounted thereon for advancing movement into operative relation to said first spindle and retraction therefrom, hydraulic means for effecting the aforesaid movements of said second spindle, electrical means for effecting translation of said first spindle, cycle initiating means manipulable by the operator, hydraulic valve means for advancing said second spindle and for establishing a drive for said first spindle in a cutting direction, and electrical circuits respectively conditioned for energization when said second spindle is advanced and retracted for controlling the return of said first spindle.

21. In a machine tool, the combination of a base; a first spindle mounted thereon for cutting and return translatory movement; a second spindle mounted thereon for advancing and retracting movement into and out of operative relation to said first spindle; hydraulic means for effecting the aforesaid movements of said second spindle and for clamping it in its advanced position; means for effecting the translatory movements of said first spindle; and plural valve means for controlling the movements of said second spindle, for controlling the clamping of said second spindle, for controlling the driven movement of said first spindle in a cutting direction, and for interrupting such cutting movement during a cycle.

22. In a machine tool, the combination of a base; a first spindle mounted thereon for cutting and return translatory movement; a second spindle mounted thereon for advancing and retracting movement into and out of operative relation to said first spindle; hydraulic means for effecting the aforesaid movements of said second spindle and for clamping it in its advanced position; electrical means for effecting the translatory movements of said first spindle; plural valve means for controlling the movements of said second spindle, for controlling the clamping of said second spindle, and for controlling the driven movement of said first spindle in a cutting direction; and electrical means for controlling the return movement of said first spindle.

23. In a machine tool, the combination of a base; a first spindle mounted thereon for cutting and return movement; a second spindle mounted thereon for advancing movement into operative relation with said first spindle and for retraction therefrom; hydraulic means for effecting said movements of said second spindle and for clamping it in its advanced position; electrical means for effecting the movements of said first spindle; plural valve means for controlling the movements of said second spindle, for controlling the clamping thereof in advanced position, for controlling the movement of said first spindle in a cutting direction, and for interrupting such movement during a cycle; and plural electrical circuits for automatically controlling the return movement of said first spindle upon retraction of said second spindle, and for manually controlling the movements of said first spindle when said second spindle is unclamped and said first spindle is disengaged from the means for driving it in a cutting direction.

24. In a machine tool, the combination of a first spindle supported for movement cutting and return strokes, separate and selectively operable drive means for moving said first spindle at feed and rapid traverse speeds, a second spindle supported for advancing and retracting movement into and out of an operative position with respect to said first spindle, means for moving said second spindle, means for clamping said second spindle in its advanced position, means for driving said spindles, and a control system for effecting operation of the machine elements in a cycle which includes advancing said second spindle and establishing the spindle drives, clamping said second spindle in advanced position and establishing the selective drive means for moving said first spindle at feed speed, conditioning the other selective drive means for operation at the end of the cutting stroke, discontinuing the drive at feed speed at the end of the cutting stroke and unclamping said second spindle, retracting said second spindle, establishing the selective drive means for moving said first spindle at rapid traverse speed, and discontinuing operation of the last mentioned drive when said first spindle reaches a predetermined position.

25. In a machine tool, the combination of a first spindle supported for movement through cutting and return strokes, separate and selectively operable drive means for moving said first spindle at feed and rapid traverse speeds, a second spindle supported for advancing and retracting movement into and out of an operative position with respect to said first spindle, means for clamping said second spindle in its advanced position, and a system for effecting and controlling machine operation including means for advancing said second spindle, means for driving the spindle, means for clamping said second spindle in advanced position, means for establishing the selective drive means for moving said first spindle at a feed speed, means for conditioning the other selective drive means for operation at the end of the cutting stroke, means for discontinuing the drive at a feed speed at the end of the cutting stroke, means for unclamping said second spindle, means for retracting said second spindle, means for establishing the selective drive means for moving said first spindle at a rapid traverse speed, and means for discontinuing operation of the last mentioned drive when said first spindle reaches a predetermined position.

26. In a hobbing machine, the combination of a first spindle supported for cutting and traverse movement, a second spindle movable into and out of operative relation to said first spindle, means for moving each of said spindles including an electric motor for driving said first spindle through its traverse movement, brake means for said motor, and control means for said brake means operable to set said brake means at the end of a traverse movement and including timing means for releasing said brake means after a predetermined interval.

27. In a machine tool, the combination of a first spindle supported for translation, hydraulically controlled means for driving said first spindle through a cutting stroke, electrically controlled means for driving said first spindle through a return stroke, a second spindle supported for advancing and retracting movement into and out of an operative position with respect to said first spindle, hydraulic means for moving said second spindle, hydraulic means for clamping said second spindle in its advanced position, hydraulically controlled means for driving said spindles, a hydraulic system including manipulable control valve means for advancing said second spindle and for establishing the spindle drives, valve means responsive to the movement of said second spindle to its advanced position for clamping it in that position and for establishing the feed speed drive to said first spindle, an electric circuit for said electrically controlled means including connections conditioned upon actuation of said manipulable control valve means for automatically energizing the electrically controlled means upon retraction of said second spindle, other connections set up when said second spindle is advanced or retracted for manual energization of said electrically controlled means, means for selectively determining the direction of movement of said first spindle by said electrically controlled means, and means for rendering the entire circuit inoperative to move said first spindle beyond predetermined limits of travel.

28. In a machine tool, the combination of a first spindle supported for translation; hydraulically controlled means for driving said first spindle through a cutting stroke; an electric motor for driving said first spindle through a return stroke; a second spindle supported for advancing and retracting movement into and out of an operative position with respect to said first spindle; hydraulic means for moving said second spindle, hydraulic means for clamping said second spindle in its advanced position; hydraulically controlled means for driving said spindles; a hydraulic control system for advancing said second spindle, for establishing the spindle drives, for clamping said second spindle in advanced position, and for establishing the feed speed drive to said first spindle; an electric circuit in control of said motor including means for automatically energizing the motor upon retraction of said second spindle, means for manually energizing said motor, and means for selectively determining the direction of movement of said first spindle.

29. In a machine tool, the combination of a first spindle supported for translation, a second spindle supported for advancing and retracting movement into and out of an operative position with respect to said first spindle, hydraulic means for moving said second spindle, hydraulic means for clamping said second spindle in its advanced position, hydraulically controlled means for translating said first spindle through a cutting stroke, hydraulically controlled means for driving said spindles, a hydraulic system controlling the movements of said first and second spindles by the hydraulic means associated therewith, a motor for translating said first spindle through a return stroke, an electric circuit in control of said motor including connections conditioned in response to control movements of said hydraulic system for automatically energizing said motor upon retraction of said second spindle, and other connections for manually energizing said motor.

30. In a machine tool, the combination of a first spindle supported for translation, a second spindle supported for advancing and retracting movement into and out of an operative position with respect to said first spindle, hydraulic means for moving said second spindle, hydraulic means for clamping said second spindle in its advanced position, hydraulically controlled means for translating said first spindle through a cutting stroke, hydraulically controlled means for driving said spindles, a hydraulic system controlling the movements of said first and second spindles by the hydraulic means associated therewith, a motor for translating said first spindle through a return stroke, an electric circuit in control of said motor including connections conditioned in response to control movements of said hydraulic system for energizing said motor, and means for selectively determining the direction of movement of said first spindle by said motor.

31. In a machine tool, the combination of a first spindle supported for movement through cutting and return strokes, separate and selectively operable drive means for moving said first spindle at feed and rapid traverse speeds, a second spindle supported for advancing and retracting movement into and out of an operative position with respect to said first spindle, means for moving said second spindle, means for driving said spindles, and a control system for effecting cyclic operation of the machine elements including means controlling the actuation of the second spindle moving means to advance said second spindle, means for establishing the spindle drive, means for establishing the selective drive means for moving said first spindle at feed speed, a manual control for the other selective drive means, means for conditioning the other selective drive means for operation at the end of the cutting stroke while disabling said manual control, means for discontinuing the drive at feed speed at the end of the cutting stroke, means controlling the actuation of said second spindle moving means to retract said second spindle, means for establishing the selective drive means for moving said first spindle at rapid traverse speed, and means for discontinuing the operation of the last mentioned drive when said first spindle reaches a predetermined position.

32. In a machine tool, the combination of a first spindle supported for movement through cutting and return strokes, separate and selectively operable drive means for moving said first spindle at feed and rapid traverse speeds, a second spindle supported for advancing and retracting movement into and out of an operative position with respect to said first spindle, means for moving said second spindle, means for driving said spindles, and a control system for effecting cyclic operation of the machine elements including means controlling the second spindle moving means to advance said second spindle, means for establishing the spindle drives, means for establishing the selective drive means for moving said first spindle at a feed speed, means for conditioning the other selective drive means for operation at the end of the cutting stroke, means for discontinuing the drive at a feed speed at the end of the cutting stroke, means controlling said second spindle moving means to retract said second spindle, means for establishing the selective drive means for moving said first spindle at a rapid traverse speed, means for discontinuing operation of the last mentioned drive when said first spindle reaches a predetermined position, and means selectively set up according to the advanced or retracted position of said second spindle for manually controlling the operation of said first spindle.

33. In a machine tool, the combination of a first spindle supported for movement through cutting and return strokes, selectively operable drive means for moving said first spindle at feed and rapid traverse speeds, a second spindle supported for advancing and retracting movement into and out of an operative position with respect to said first spindle, means for moving said second spindle, means for driving said spindles, and a control system for effecting operation of the machine elements in a cycle, said system including means controlling the second spindle moving means to advance said second spindle, means for establishing the spindle drives, means for establishing the selective drive means for moving said first spindle at a feed speed, means for conditioning the other selective drive means for operation at the end of the cutting stroke, a manual control operative when said second spindle is retracted, means for disabling said control when said second spindle is advanced, a second manual control operative when said second spindle is advanced, means for conditioning said second manual control when said second spindle is advanced, means for discontinuing the drive at feed speed at the end of the cutting stroke, means controlling the second spindle moving means to retract said second spindle, means for establishing the selective drive means for moving said first spindle at a rapid traverse speed, and means for discontinuing operation of the last mentioned drive when said first spindle reaches its original position.

34. In a machine tool, the combination of a first spindle supported for movement through cutting and return strokes, separate and selectively operable drive means for moving said first spindle at feed and rapid traverse speeds, a second spindle supported for advancing and retracting movement into and out of an operative position with respect to said first spindle, means for moving said second spindle, means for driving said spindles, and a control system for effecting operation of the machine elements including means controlling the second spindle moving means to advance said second spindle, means for establishing the spindle drives, means for establishing the selective drive means for moving said first spindle at a feed speed, means for discontinuing said drive at the end of the cutting stroke, means for controlling said second spindle moving means to retract said second spindle, means for establishing the selective drive means for moving said first spindle at a rapid traverse speed, means for discontinuing operation of the last mentioned drive when said first spindle reaches a predetermined position, and means for applying a braking force to said last mentioned drive after its operation has been discontinued.

35. In a machine tool, the combination of a first spindle supported for movement through cutting and return strokes, selectively operable drive means for moving said first spindle at feed and rapid traverse speeds, a second spindle supported for advance and retracting movement into and out of an operative position with respect to said first spindle, means for moving said second spindle, means for driving said spindles and a control system for effecting the operation of the machine elements including means controlling the second spindle moving means to advance said second spindle, means for establishing the selective drive means for moving said first spindle at a feed speed and for discontinuing such drive at the end of the cutting stroke, means for controlling the said second spindle moving means to retract said second spindle, means for establishing the selective drive means for moving said first spindle at a rapid traverse feed and for discontinuing operation thereof when said first spindle reaches its original position, and manually operable means for controlling machine operation including manual control means operative when said spindle is retracted and other manual control means operative when said second spindle is advanced.

BENJAMIN R. PURVIN.